United States Patent [19]

Uehara et al.

[11] 3,873,777

[45] Mar. 25, 1975

[54] SIGNAL TRANSMISSION SYSTEM FOR TRANSMITTING A PLURALITY OF SERIES OF SIGNALS

[75] Inventors: Takashi Uehara, Tokyo; Takehiko Yoshino, Yokohama; Eiichi Sawabe; Hisakichi Yamane, both of Tokyo; Akio Yanagimachi, Kawasaki; Masaaki Fukuda, Tokyo; Tatsuo Kayano, Tokyo; Teruhiro Takezawa, Tokyo; Michio Masuda, Tokyo; Hiroaki Nabeyama, Yokohama, all of Japan

[73] Assignees: Nippon Hoso Kyokai; Hitachi Limited; Hitachi Electronics, Ltd., all of Tokyo, Japan

[22] Filed: May 21, 1973

[21] Appl. No.: 362,209

[30] Foreign Application Priority Data

| | | |
|---|---|---|
| May 23, 1972 | Japan | 47-50989 |
| May 23, 1972 | Japan | 47-50991 |
| May 23, 1972 | Japan | 47-50992 |

[52] U.S. Cl. .......................... 179/15 A, 179/15 BW

[51] Int. Cl. .......................... H04j 3/00

[58] Field of Search ...... 179/15 AC, 15.55 T, 15 A, 179/15 BW, 15 BM

[56] References Cited

UNITED STATES PATENTS

| | | | |
|---|---|---|---|
| 3,355,554 | 11/1967 | Fuss | 179/15.55 T UX |
| 3,558,823 | 1/1971 | Brilliant | 179/15 AC |
| 3,689,699 | 9/1972 | Brenig | 179/15 BS |
| 3,763,328 | 10/1973 | Lester | 179/15.55 T X |
| 3,789,137 | 1/1974 | Newell | 179/15.55 T UX |
| 3,789,144 | 1/1974 | Doyle | 179/15.55 T |

*Primary Examiner*—David L. Stewart
*Attorney, Agent, or Firm*—Stevens, Davis, Miller & Mosher

[57] ABSTRACT

In a time division multiplexing transmission system for transmitting a plurality of interrupted signals such as picture signals and pulse modulated signals corresponding to a continuous signal such as PCM audio signals through a transmission path having a plurality of channels, each of which alternately has pause and signal periods at a predetermined time sequence, the interrupted signals are allotted to the pause period and the pulse modulated signals are alloted to the signal period. The pulse modulated signals are divided into two series of signals, each of which is divided into first signal parts having a period equal to the signal period and second signal parts having a period equal to the pause period. The first or second signal parts of both signal series are delayed in such a way that the delay means in the receiver can be simplified and the delayed first or second signal parts and the non-delayed second or first signal parts are combined in a way that these signal parts form a new interrupted signal series allotted in the signal periods. At the receiver the received signal is converted to the original pulse modulated signals so as to reproduce the original continuous signal. This system particularly suggests a novel audio signal transmission with high quality of reproduced sound in the case of intermittently transmitting a PCM audio signal together with a video signal, such as a still picture transmission system in which the audio and video signals are transmitted per unit time, i.e., audio and video frames. In addition, this system has an advantageous effect in which the construction of the receiver can be simplified.

19 Claims, 38 Drawing Figures

PATENTED MAR 25 1975 SHEET 04 OF 27 3,873,777

PATENTED MAR 25 1975 SHEET 10 OF 27 3,873,777

SIGNAL TRANSMISSION SYSTEM FOR TRANSMITTING A PLURALITY OF SERIES OF SIGNALS

BACKGROUND OF THE INVENTION

The present invention relates to a time division multiplexing transmission system, and particularly relates to a time division multiplexing transmission system for transmitting video signals of a plurality of still pictures and pulse modulated (e.g., PCM) audio signals related thereto by turns at a time rate of, for example, 1 to 2 television frames.

Especially, this invention provides a still picture transmission system for alternately transmitting video signals and PCM audio signals which are intermittently divided into different periods, nevertheless without loss of audio information.

The invention is directed to a transmission system with a transmitter (FIG. 6) which reorganizes two incoming separate series of TDM PCM frames for transmission over three TDM transmission channels (FIGS. 1*e* and 5*c*) to provide gaps in the incoming series of frames into which video information can be inserted and a receiver (FIG. 11) for recovering the information in its orginal form.

As to a signal which is divided into given constant periods, a television video signal or a facsimile signal which is divided into the periods of scanning, and a TDM signal obtained by time-divisionally multiplexing audio signals and other information signals in the form of pulse code modulation (PCM) are known.

A type of broadcast which is comformable with the needs in the variety and individuality of human life can be considered one of the ideal broadcasts in the future. Super multiplexed still picture broadcasting elicits great interest of broadcasters and educators as an economical and technological means whereby a great deal of information can be conveyed.

The concept of a still picture transmission system in the form of television signals has been reported by W.H. Huges et al., at Oklahoma State University. This system has been planned for a cable transmission system which facilitates two-way transmission. But, they have never reported details of the transmission of accompanying sounds. In most cases, it is preferable to transmit the sound together with the picture because, in general, watching of a television picture without sound does not affect the human senses enough, and it is unsatisfactory for viewers. Therefore, it is desirable to develop a novel transmission system of still pictures and corresponding sounds in order to accomplish the most effective use and the acceptability for viewers of still picture broadcasting.

The present invention is intended to provide a novel transmission system which can transmit still pictures together with sound related thereto. It should be noted that the present invention is not limited to a transmission system for still pictures and their related sounds, but may be used to transmit television video signals or facsimile signals which are divided into scanning periods and are inserted with any other time division multiplexed information signals in the form of PCM, PTM (pulse time modulation), PWM (pulse width modulation) or PAM (pulse amplitude modulation) signal. However, for the sake of explanation, in the following description the transmission system for transmitting still pictures such as television signals and related sounds through a television transmitting path will be explained. Now, assuming that video signals of still pictures and related audio PCM signals are trnsmitted on the same transmission path multiplexed at a rate of 1 to 2 television frames of NTSC system, video signals of each still picture are transmitted in one frame period (about one-thirtieth seconds) as quasi-NTSC signals and audio PCM signals are transmitted in successive two frame periods (about one-fifteenth seconds). A plurality of still pictures and their related sounds comprise a program of one group. At a transmitter end, this program is transmitted repeatedly and at a receiving end one can select a desired still picture and its related sound from the received source program. Moreover at the transmitting end may be provided a plurality of programs which are transmitted by turns repeatedly in a respectively given period and at the receiving end one can select a desired programs from a plurality of transmitted program. A time duration of a program is determined in consideration of various factors such as amounts of information to be transmitted, i.e., the number of still pictures, necessary time duration of related sounds, etc., property of a transmission path and its bandwidth, complexity of apparatuses at transmitting and receiving ends, and permissible access time (permissible waiting time) on the basis of the psychological property of viewers. In the embodiment described hereinafter a time duration of a program is assumed to be 5 seconds.

In the above-mentioned still picture-audio PCM multiplexing transmission system, the PCM audio signal is contained in audio frames AF which are time-sequentially interrupted by the video frames VF which contain the video signal, so that the PCM audio signal is transmitted discontinuously. Accordingly, this transmission system has a drawback in that the sound cannot be reproduced with high quality in an ordinary way because of the intermittence of transmission of the PCM audio signal.

Besides the above-mentioned transmission system for transmitting still pictures and their related sounds, there are many other transmission systems in which a first information signal and a second information signal are transmitted by turns at a given time rate. For example, a facsimile signal and an audio signal accompanied therewith can be transmitted in turn at a specified time rate.

The present invention has for its object to provide a novel signal transmission system, wherein high quality of reproduced sound can be attained in the case of transmitting a continuous signal through an intermittent transmission path.

It is another object of the present invention to provide a time division multiplexed transmission system, wherein a continuous signal is converted to an interrupted signal in order to transmit the continuous signal through an intermittent transmission path and in which, in the receiving end, the received signal is converted again to the continuous signal so as to reproduce the original signal.

It is another object of the present invention to provide a transmission system, wherein a PCM audio signal is interrupted by video signals so as to insert video frames of the video signals alternately between two audio frames of the PCM audio signal.

It is another object of the present invention to provide a transmission system which is preferable for multiplexing audio signals in time division after pulse-code-modulating treatment.

It is still another object of the present invention to provide a transmitter suitable for use in the above mentioned transmission system for transmitting a continuous signal through an intermittent transmission channel.

It is further object of the present invention to provide a receiver suitable for use in the above mentioned transmission system, wherein the received intermittent signal is converted to the continuous signal corresponding to the original signal with high quality, i.e., without any loss of information.

SUMMARY OF THE INVENTION

In accordance with the present invention, a signal transmission system for transmitting a plurality of series of signals through a transmission path constituted by a plurality of channels provided alternately with pauses and signal periods at a predetermined time sequence comprises, at the transmitting end, gating means for dividing each series of said plurality of series of signals into first signal parts the period of which is equal to said signal period and second signal parts the period of which is equal to said pause period; delaying means for delaying either one of said first and second signal parts; signal combining means for forming a new series of signals by sequentially combining only the second signal parts of said plurality of signals; and signal transmitting means for transmitting said series of signals obtained from said signal combining means through other channels which are different from the channels transmitting said first signal parts, and further comprises, at the receiving end, signal reproducing means for reproducing the first and second series of signals from the received signal; gating means for dividing said first and second series of signals into said first and second signal parts; delaying means for delaying the other one of said first and second signal parts which is not delayed on the transmitting side; and signal combining means for combining the delayed signal part from said delay means with the other signal part.

BRIEF DESCRIPTION OF THE DRAWINGS

This invention is explained by referring to the accompanied drawings as follows.

DESCRIPTION OF THE PREFERRED EMBODIMENT

Figure 1A:
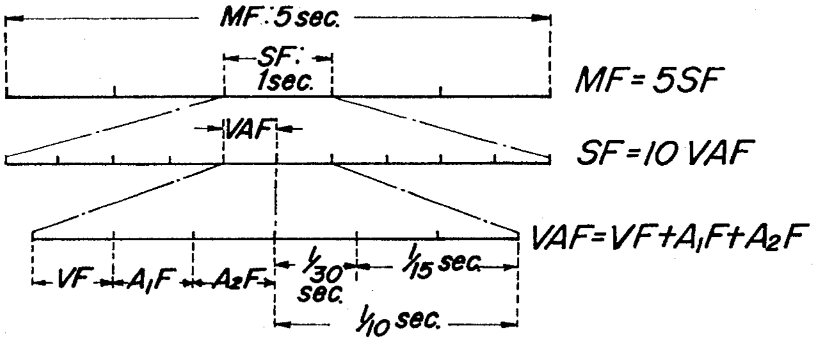
FIGS. 1*a* and 1*b* show formats of a master frame, a sub-frame, a video-audio frame, and a portion of said frame, respectively, of a video-audio signal to be transmitted.

Now, a basic construction of the transmitting system according to this invention will be explained first with reference to FIGS. 1 to 4. FIG. 1 shows a format of the video-audio multiplexed signal to be transmitted. FIGS 1*a* denotes a program of five seconds. The program is termed as a master frame MF. The master frame MF consists of five sub-frames SF, each of which has a duration of 1 second. As also shown in FIG. 1*a*, each sub-frame SF consists of ten video-audio frames VAF and each video-audio frame VAF has a duration of one-tenth seconds. As illustrated in FIG. 1*a*, each video-audio frame VAF further consists of a video frame VF of one television frame period (about one-thirtieth seconds) and an audio frame AF of two television frame periods (about one-fifteenth second). Each audio frame AF further consists of a first audio frame $A_1F$ and a second audio frame $A_2F$, each having one television frame period (about one-thirtieth second). Thus, the master frame MF is composed of 150 television frames.

Figure 1B:
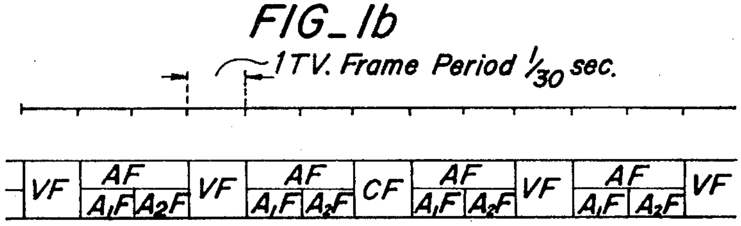

By constructing the master frame MF as mentioned above, in the master frame MF, there may be inserted 50 still pictures. However, in fact, it is necessary to transmit code signals for indentifying still pictures and their related sounds and for indicating timing of starts and ends of various signals. It is advantageous to transmit such code signals in the video frames VF rather than in the audio frames AF. In the present embodiment, code signals are transmitted in a video frame VF of each sub-frame SF. A frame during which the code signals are transmitted is referred to as a code frame CF. FIG. 1*b* shows a part of the sub-frame SF which includes said code frame CF. Therefore, in the master frame MF, there are inserted 45 still pictures and thus, it is required to transmit 45 sounds related thereto, i.e., 45 channels of audio signals.

Figure 1C:
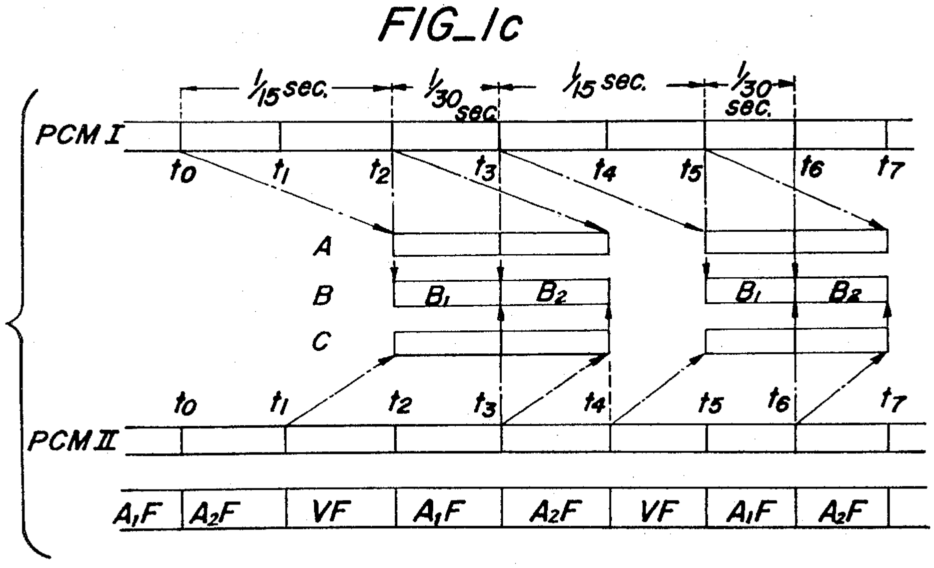
FIG. 1*c* shows a principle of the allocation of an audio PCM signal according to the present invention.

Sound like speech or music needs several seconds or more to give some meaning, because sound is inherently continuous. In the present embodiment an average duration of each sound relating to each still picture is limited to 10 seconds. As mentioned above, the master frame MF has a duration of only 5 seconds, so that in order to transmit sounds of 10 seconds, it is necessary to use the number of transmission channels twice the number of sound channels. That is, in order to transmit sounds of 45 channels relating to 45 still pictures, it is required to establish 90 audio transmission channels. Moreover, it is impossible to transmit audio signals in the video frames VF. Therefore, PCM audio signals must be divided and allocated in the audio frames AF only. In order to effect such an allocation treatment for audio signals, the PCM audio signals of ninety channels are divided into two groups PCMI and PCMII as shown in FIG. 1*c*. And then, the subsequent treatment thereto is effected in practice for reasons which will be described later by referring to FIG. 5. That is, portions of PCMI corresponding to the second audio frames $A_2F$ and the video frames VF are delayed for two television frame periods of about one-fifteenth seconds and portions of PCMII corresponding to the video frames VF and the first audio frames $A_1F$ are delayed for one television frame period of about one-thirtieth seconds. PCM signals thus delayed form audio channels A and C is illustrated in FIG. 1*c*, respectively. Portions of PCMI and PCMII which correspond to the first audio frames $A_1F$ and the second audio frames $A_2$ F, respectively, are directly inserted in audio channels $B_1$ and $B_2$ to form an audio channel B. In this manner, in the audio channels A, B and C, there are formed vacant frames which have a time position corresponding to the video frames VF. By effecting such an allocation for the audio signals, in each audio frame AF ($= A_1F + A_2F$) it is necessary to contain a number of audio channels which are equal to one and half times of the number of the channels of the audio PCM signals. In the present embodiment, 135 audio transmission channels have to be provided in each audio frame AF. In this manner, audio signals of 135 channels are inserted in each audio frame AF in the form of PCM signals allocated in given time slots.

An embodiment of a transmitting apparatus for effecting the above mentioned still picture-PCM audio signal time division multiplexing transmission will now be explained with reference to FIG. 2. The transmitting apparatus comprises a video signal processing system and an audio signal processing system. The video signal processing system comprises a random access slide projector 1, on which are loaded slides of still pictures to be transmitted. The projector 1 projects optically an image of a slide of a still picture onto a television camera 3. The camera 3 picks up the image and produces an electrical video signal. The video signal is supplied to a frequency-modulator 5 and frequency-modulates a carrier by the video signal. FM video signal is amplified by a recording amplifier 7 and an amplified FM video signal is supplied to a video recording head 9. This head 9 is an air-bearing type floating head and is arranged to face a surface of a conventional magnetic disc memory 11. The head 9 is driven by a head driving mechanism 13 so as to move linearly in a radial direction above the surface of the disc memory 11. The disc 11 is rotatably driven by a motor 15 at a rate of 30 rounds per second. There is further provided an air-bearing type floating head 17 for reproducing FM video signals recorded on the disc memory 11. The reproducing head 17 is also driven by a driving mechanism 19 so as to move linearly in a radial direction above the surface of the disc 11. The magnetic heads 9 and 17 are moved intermittently so that on the surface of the disc 11 there are formed many concentric circular tracks. On each track is recorded the FM video signal for one television frame period corresponding to each still picture. The above arrangement for recording a video signal is a conventional so-called video disc recorder, for example type HS-100 sold from AMPEX Company, used in a usual television station. The reproduced FM video signal from the reproducing head 17 is supplied to a reproducing amplifier 21 and the amplified FM video signal is further supplied to a frequency-demodulator 23. The demodulated video signal from the frequency-demodulator 23 is supplied to a time-error compensator 25, in which time-errors of the demodulated video signal due to non-uniformity of rotation of the disc memory 11 can be compensated. The time-error compensator 25 may be a device which is sold from AMPEX Company under a trade name of "AMTEC." The time-error compensator 25 has a voltage controlled delay line and an error detector, to both of which the demodulated video signal from the demodulator 23 is applied. The error detector also receives the stable timing reference input signal U from the synchronizing and timing signal generator 61 and detects the phase difference between the two input signals as as to produce an error voltage proportional to said phase difference. Said delay line receives the error signal as a control voltage, by which the delay time of the demodulated video signal is controlled to produce a time corrected video output signal having a fixed phase. The time-error compensated video signal is supplied to a video input terminal of a video-audio multiplexer 27.

The audio signal processing system comprises an audio tape recorder 29 of the remote controlled type. On this tape recorder 29 is loaded a tape on which many kinds of audio signals related to the 45 still pictures have been recorded. The reproduced audio signals from the tape recorder 29 are supplied to a switcher 31 which distributes each audio signal corresponding to each still picture to each pair of recording amplifiers 33-1, 33-2; 33-3, 33-4 . . . 33-n. The amplified audio signals from the amplifiers 33-1, 33-2, 33-3 . . . 33-n are supplied to audio recording heads 35-1, 35-2, 35-3 . . . 35-n, respectively. There is provided an audio recording magnetic drum 37 which is rotated by a driving motor 39 at a rate of one revolution for 5 seconds. As already described above, each sound corresponding to each still picture lasts for 10 seconds, so that each audio signal of each sound is recorded on two tracks of the magnetic drum 37 by means of each pair of audio recording heads 35-1, 35-2; 35-3, 35-4 . . . 35-n. That is, a first half of a first audio signal for 5 seconds is recorded on a first track of the drum 37 by means of the first recording head 35-1 and then a second half of the first audio signal is recorded on a second track by means of the second head 35-2. In this manner, the successive audio signals corresponding to the successive still pictures are recorded on the magnetic drum 37.

The audio signals recorded on the drum 37 are simultaneously reproduced by audio reproducing heads 41-1, 41-2, 41-3 . . . 41-n, the number of which corresponds to the number of the audio recording heads 35-1, 35-2 . . . 35-n. In the present embodiment $n$=90. The reproduced audio signals are amplified by reproducing amplifiers 43-1, 43-2, 43-3 . . . 43-n. The amplified audio signals are supplied in parallel to a multiplexer 45 in which the audio signals are multiplexed in time division mode to form a time division multiplexed (TDM) audio signal. The TDM audio signal is then supplied to an A-D converter 47 to form a PCM-TDM audio signal. This PCM audio signal is further supplied to an audio allocation processor 49 in which the PCM audio signal is allocated in the audio frames AF as explained above with reference to FIG. 1$c$. The detailed construction and operation of the audio allocation processor 47 will be explained later. The PCM audio signal supplied from the processor 49 is a two-level PCM signal. This two-level PCM signal is converted in a two-four level converter 51 into a four-level PCM signal. The four-level PCM audio signal is supplied to an audio input terminal of the video-audio multiplexer 27. In the multiplexer 27, the video signal from the time-error compensator 25 and the four-level PCM audio signal from the two-four level converter 51 are multiplexed in a time division mode. A multiplexed video-audio signal from the multiplexer 27 is supplied to a code signal adder 53 which adds to said signal the code signal for selecting desired still pictures and their related sounds at a receiver end to form the signal train shown in FIG. 1$b$. The signal train from the code signal adder 53 is further supplied to a synchronizing signal adder 55 in which a digital synchronizing signal is added to form an output video-audio signal to be transmitted.

Figure 2:
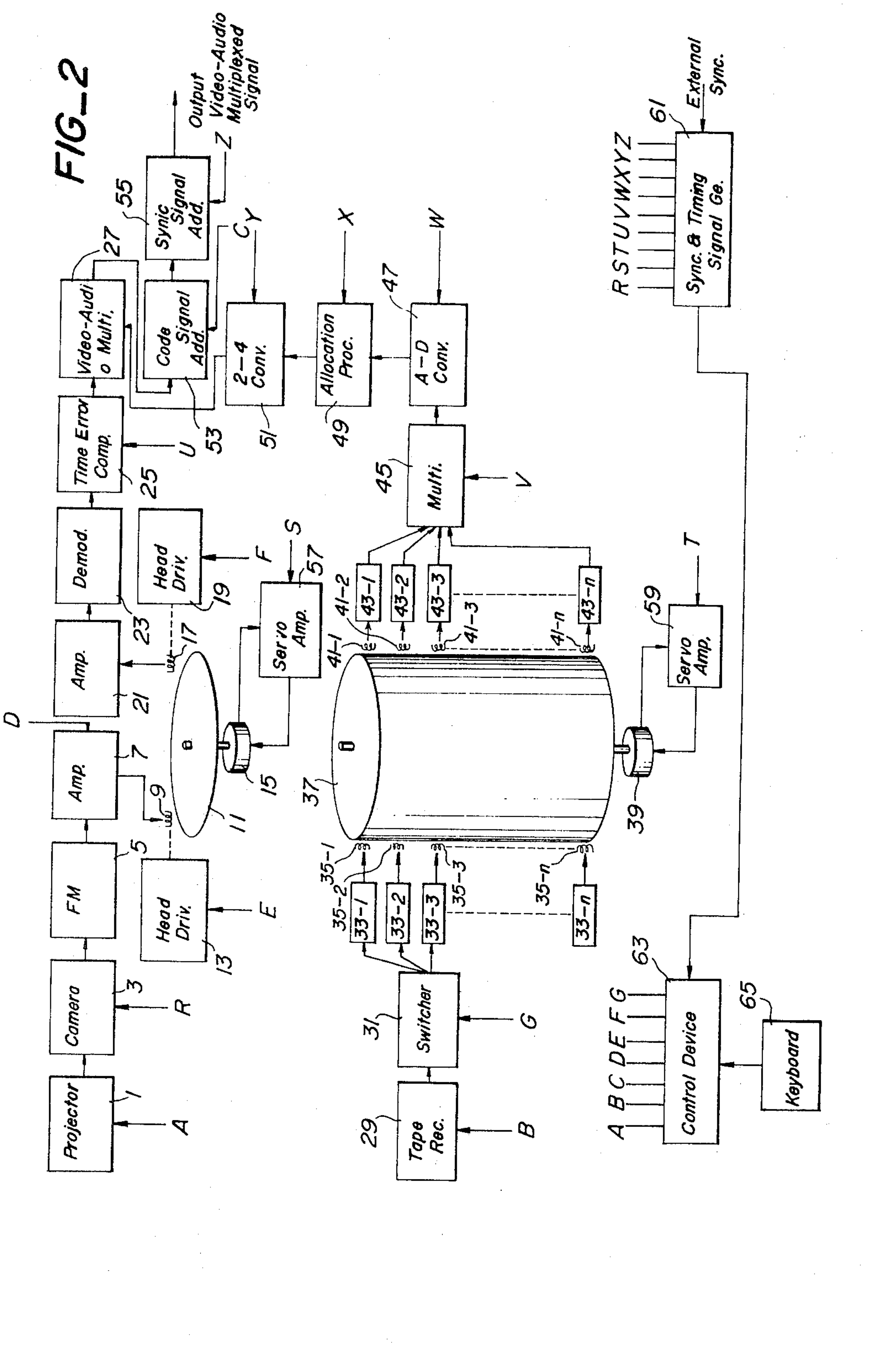
FIG. 2 is a schematic diagram embodying the transmitting apparatus according to this invention, wherein the still picture and PCM audio signal are multiplexed in time division.

In the transmitting apparatus shown in FIG. 2, there are further provided servo amplifiers 57 and 59 so as to maintain the rotation of the video disc memory 11 and the audio magnetic drum 37 constant.

In order to transmit the output video-audio signal as a television signal, it is necessary to synchronize the operation of the various portions of the transmitting apparatus with an external synchronizing signal. To this end, there is further provided a synchronizing and timing signal generator 61 which receives the external synchronizing signal and generates synchronizing and timing signals R, S, T, U, V, W, X, Y and Z for the camera 3, the servo amplifiers 57 and 59, the time-error compensator 25, the audio multiplexer 45, the A-D converter 47, the audio allocation processor 49, the two-four level converter 51 and the synchronizing signal adder 55, respectively. The generator 61 further supplies synchronizing and timing signals to a control device 63 which controls selection of still pictures and sounds, recording, reproducing and erasing of video and audio signals, generation of code signals, etc., and the control device 63 further receives instruction signals from an instruction keyboard 65 and supplies control signals A, B, C, D, E, F and G to the projector 1, the audio tape recorder 29, the code signal adder 53, the video recording amplifier 7, the video recording head driving mechanism 13, the video reproducing head driving mechanism 19 and the switcher 31, respectively.

In the transmitting apparatus mentioned above, the random access slide projector 1 is controlled by the control device 63 to project successively 45 still pictures and the video recording head 9 is driven by the mechanism 13 so as to face tracks of the disc memory 11. In this case, the video recording head 9 moves in one direction to face alternately 23 tracks so as to record 23 still pictures and then moves in an opposite direction to face the remaining 22 tracks which are situated between the tracks on which the video signals of the first 23 still pictures have been recorded. The video recording amplifier 7 receives a gate signal D of one-thirtieth seconds from the control device 63 and supplies a recording current to the video recording head 9 for said period. The motor 15 for driving the disc 11 is controlled by the servo amplifier 57 to rotate at a constant angular velocity of 30 rps. The servo amplifier 57 detects the rotation of the disc 11 and controls the motor 15 in such a manner that the detected signal coincides with the timing signal S supplied from the generator 61. The video reproducing head 17 is driven by the mechanism 19 in the same manner as the video recording head 9. The reproducing head 17 is moved in the audio frame and code frame period and is stopped in the video frame period to reproduce the video signal. The reproducing head 17 repeatedly reproduces the video signals of 45 still pictures.

As already explained, the audio signal of each sound relating to each still picture is recorded on two tracks of the magnetic drum 37. This drum 37 is driven by the motor 39 and this motor 39 is controlled by the servo amplifier 59. The servo amplifier 59 detects the rotation of the drum 37 and controls the motor 39 in such a manner that the detected signal coincides with the timing signal T supplied from the generator 61.

It is possible to revise a portion of the previously recorded pictures or sounds to new pictures or sounds while reproducing the remaining pictures and sounds. For picture information, the video recording head 9 is accessed to a given track by the head driving mechanism 13 and a new picture is projected by the random access slide projector 1 and picked up by the television camera 3. The video signal thus picked up is supplied to the frequency-modulator 5 and then to the recording amplifier 7. Before recording, a d.c. current is passed through the video recording head 9 and the previously recorded video signal is erased. Then the new video signal is recorded on the erased track of the disc 11. For sound information, a new sound is reproduced by the audio tape recorder 29 and an assigned track of the magnetic drum 37 is selected by the switcher 31. Before recording, the selected track is erased by an erasing head (not shown) corresponding to the selected recording head. These operations are controlled by the control signals supplied from the control device 63 on the basis of the instruction from the instruction keyboard 65 and the timing signals from the generator 61.

Figure 3:
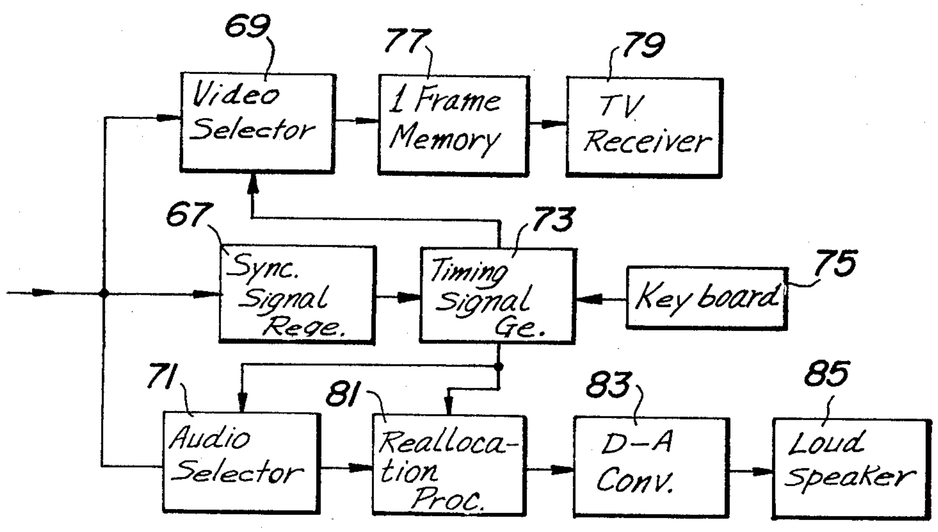
FIG. 3 is a block diagram embodying the receiver of the signal transmission system according to this invention.

Next, a basic construction of a receiver will be explained with reference to FIG. 3. A received signal is supplied in parallel to a synchronizing signal regenerator 67, a video selector 69 and an audio selector 71. In the synchronizing signal regenerator 67, a synchronizing signal is regenerated from the received signal. The synchronizing signal thus regenerated is supplied to a timing signal generator 73. The timing signal generator 73 is also connected to an instruction keyboard 75. The timing signal generator 73 produces timing signals to be supplied to the video selector 69 and the audio selector 71 on the basis of the synchronizing signal from the regenerator 67 and the instruction from the keyboard 75. The video selector 69 selects a desired video signal and the audio selector 71 selects a desired audio signal related to the desired video signal. The selected video signal of the desired still picture is once stored in a one-frame memory 77, and then the stored video signal of one frame period is repeatedly read out to form a continuous television video signal. This television video signal is displayed on a television receiver 79.

The selected audio PCM signal is supplied to an audio reallocation processor 81 to recover a continuous audio PCM signal. The audio PCM signal is supplied to a D-A converter 83 to form an analogue audio signal. This audio signal is reproduced by a loud speaker 85.

Figure 4:
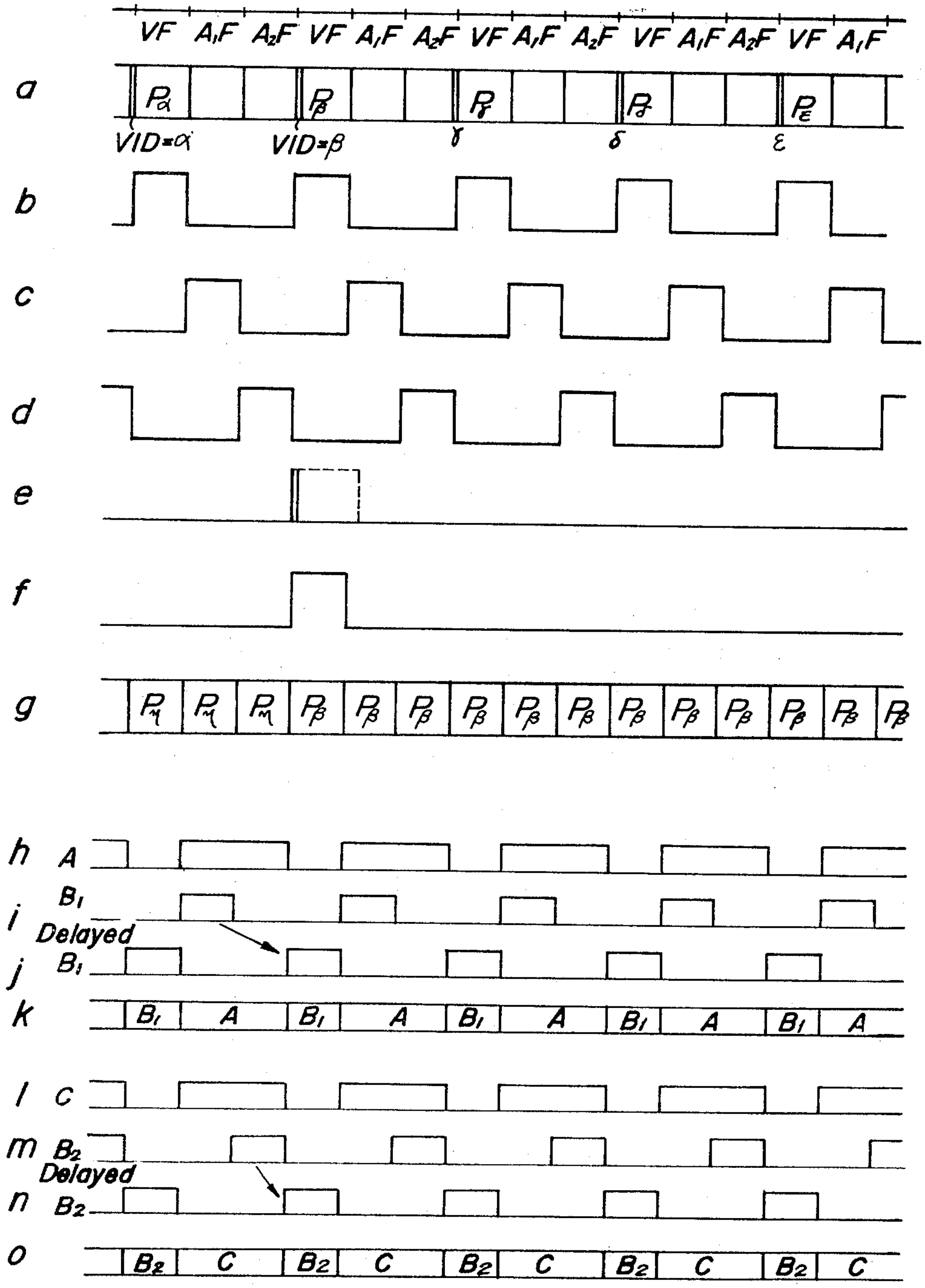
FIGS. 4*a*–4*o* show various waveforms of the signals at many parts of the receiver of FIG. 3.

Now, the operation of the receiver will be explained in detail with reference to FIG. 4 showing various waveforms.

In the synchronizing signal regenerator 67, PCM bit synchronizing signals and PCM frame synchronizing signals are reproduced in the manner which will be described later in detail together with gate signals shown in FIGS. 4*b*, 4*c* and 4*d*. The timing signal generator 73 detects a picture identification code VID which has been transmitted in a vertical flyback blanking period at a foremost portion of the picture transmission frame period VF. As shown in FIG. 4*a*, the picture identification code $\alpha$ for the picture P$\alpha$, the picture identification code $\beta$ for the picture P$\beta$ and so on are transmitted at the foremost portion of the picture transmission frame periods VF, and the timing signal generator 73 compares the detected picture identification code VID with a desired picture number, for example $\beta$ instructed by the keyboard 75. If they are identified to each other, the timing signal generator 71 produces a coincidence pulse shown in FIG. 4*e*. The coincidence pulse is prolonged by a monostable multivibrator circuit as shown by a dotted line in FIG. 4*e* and the prolonged pulse is gated out by the gate signal shown in FIG. 4*b* to form a video gate signal illustrated in FIG. 4*f*. The video gate signal is supplied to the video selector 69 to gate out the video signal P$\beta$ in a desired video frame and the video signal P$\beta$ thus selected is stored in the one-frame memory 77. In the memory 77, the video signal P$\beta$ is repeatedly read out so that the continuous video signal shown in FIG. 4*g* is supplied to the television receiver 79. Thus, the television receiver 79 displays the video signal P$\beta$ as a still picture instead of the picture P$\eta$ which has been displayed.

The audio signal is transmitted in the audio frame periods $A_1F$ and $A_2F$ in the form of PCM multiplexed signal. The timing signal for selecting a PCM channel number corresponding to the desired picture number, for example $\beta$, is generated by counting the above mentioned PCM bit synchronizing pulses and PCM frame synchronizing pulses. The timing signal thus generated is supplied to the audio selector 71 to select the desired PCM signal related to the selected still picture. FIG. 4*h* illustrates a pulse series corresponding to the audio channel A selected by the audio selector 71 and FIG. 4*i* shows a pulse series corresponding to the audio channel $B_1$ selected by the audio selector 71 and gated out by the gate signal shown in FIG. 4*c*. The audio reallocation processor 81 supplies the PCM pulse series shown in FIG. 4*h* directly to the D-A converter 83 and also supplies the PCM pulse series of FIG. 4*i* to the D-A converter 83, the latter being previously delayed by two television frame period as shown in FIG. 4*j*. To this end, the timing signal from the generator 73 is supplied to the processor 81. The pulse series shown in FIGS. 4*h* and 4*j* are combined to form a continuous pulse series shown in FIG. 4*k*. The combined PCM signal is converted by the D-A converter 83 into the continuous analogue audio signal.

When the desired sound is transmitted in the channel C and $B_2$, the same operation as above will be carried out as shown in FIGS. 4*l*, 4*m*, 4*n* and 4*o* to form a desired continuous analogue audio signal. The picture number and the PCM channel number may be correlated to each other in such a manner that even number pictures correspond to the audio channels A and $B_1$ and odd number pictures correspond to the audio channels C and $B_2$.

Referring to FIG. 5, an embodiment of a still picture transmission system according to the present invention will be explained, in the case in which the audio frame (AF) period is two TV frames (2F) and the video frame (VF) period is one TV frame (1F).

Figures 5A, 5B, 5C, 5D:
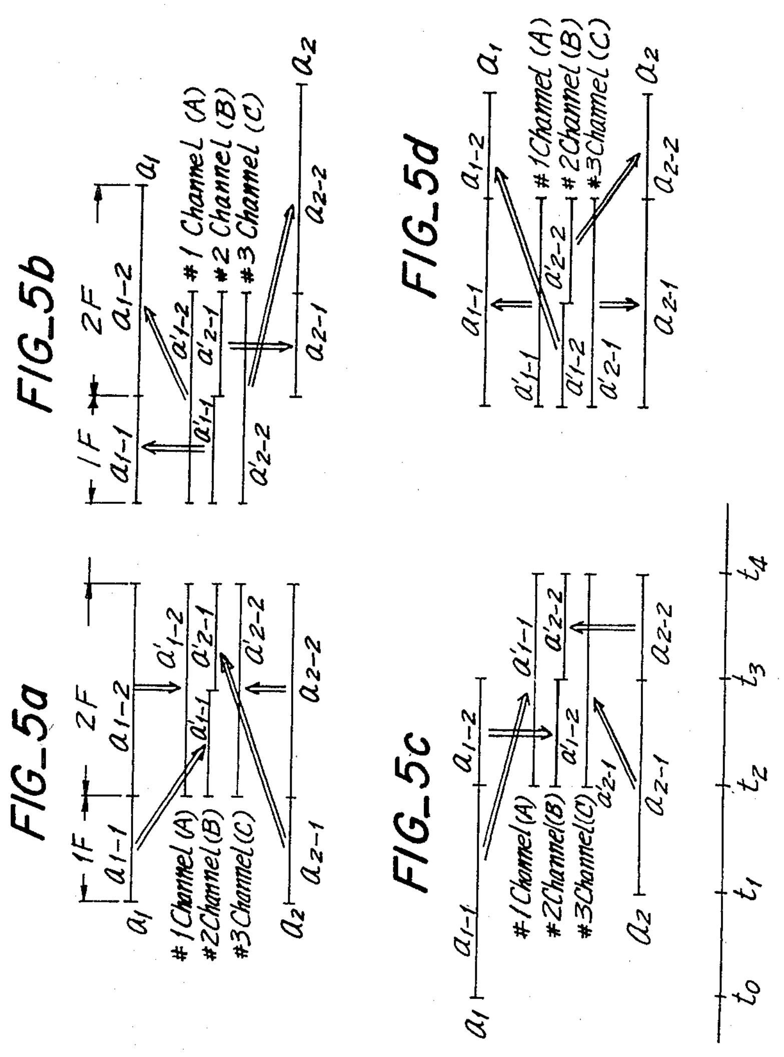
FIG. 5*a* shows a principle of the basic signal combination according to the present invention.
FIG. 5*b* shows a principle of the basic signal separation according to the present invention.
FIG. 5*c* is an explanatory diagram of one embodiment of the combination of actual audio signals.
FIG. 5*d* is an explanatory diagram of one embodiment of the separation of the signal thus combined according to the present invention.

As shown in FIG. 5*a*, two channels of audio signal $a_1$ and $a_2$ are respectively divided into parts $a_{1\text{-}1}$ and $a_{2\text{-}1}$ corresponding to the VF period and parts $a_{1\text{-}2}$ and $a_{2\text{-}2}$ corresponding to the AF period. The parts $a_{1\text{-}1}$ and $a_{2\text{-}1}$ are delayed by 1F and 2F, respectively. Both of the thus delayed parts $a'_{1\text{-}1}$ and $a'_{2\text{-}1}$ are time-sequentially combined to form a new signal B which is contained in the No. 2 channel. The remaining parts $a_{1\text{-}2}$ and $a_{2\text{-}2}$ are contained respectively in the No. 1 and No. 3 channels as signals A and C. In this manner, two kinds of sound signals having a time length of 3F are converted to three resultant signals contained in the channels of 2F.

In order to reproduce the original signals $a_1$ and $a_2$ from the resultant signals A, B and C of FIG. 5a at the receiving side, the process shown in FIG. 5b is employed. In this case, the amount or time length of the signal to be temporarily stored for the reallocation of the resultant signals is 2F as is clear from FIG. 5b. Because, in the transmitting side, the 1F parts $a_{1\text{-}1}$ and $a_{2\text{-}1}$ are time-sequentially combined after being delayed or stored, it is necessary contrarily to store the 2F parts $a'_{1\text{-}2}$ and $a'_{2\text{-}2}$ of the received signals in order not to reverse the sequence of the continuous signals to be reproduced at the receiving side. In a practical broadcasting system, however, it is preferable to exchange the parts to the contrary as far of the signals to be delayed or temporarily stored in the transmitting side, since, in order to pervade the still picture broadcasting, it is desired to reduce the amount or time length of the signal to be stored so as to make simple the configuration of the receiving unit compared with the transmitting unit. That is, in the case shown in FIGS. 5c and 5d, the time lengths of the parts $a_{1\text{-}1}$ and $2_{2\text{-}1}$ to be delayed in the transmitting side are 2F, and the time lengths of the parts $a_{1\text{-}2}$ and $a_{2\text{-}2}$ to be temporarily stored in the receiving side are 1F. Further, as shown in FIG. 5c, the beginning of the audio signal $a_2$ is delayed by 1F period, and then the part $a_{2\text{-}1}$ is delayed by 1F period so as to form a signal $a'_{2\text{-}1}$ which is contained in the channel No. 3. The part $a_{1\text{-}1}$ is delayed by 2F period so as to form a signal $a'_{1\text{-}1}$ which is contained in the channel No. 1. Both of the remaining parts $a_{1\text{-}2}$ and $a_{2\text{-}2}$ are combined so as to be contained in the channel No. 2. Consequently, when reproducing in the receiving side, as shown in FIG. 5d, the longer parts $a_{1\text{-}1}$ and $a_{2\text{-}1}$ are not delayed, and then the shorter part $a'_{1\text{-}2}$ and part $a'_{2\text{-}2}$ are delayed by 2F, and 1F periods respectively. The resultant signals after such delaying are combined with the parts $a_{1\text{-}1}$ and $a_{2\text{-}1}$ so as to reproduce the original signals $a_1$ and $a_2$. According to this processing, it is sufficient that the signal of only 1F period be stored by delay or storage means of the receiving unit, so that the components of the receiving terminal become simple and inexpensive.

As clearly shown in FIGS. 5c and 5d, according to the above method, two signals $a_1$ and $a_2$ are divided into sections or parts such as $a_{1\text{-}1}$, $a_{1\text{-}2}$, $a_{2\text{-}1}$, $a_{2\text{-}2}$, the sequence of which is rearranged. In this case, the sequence of signals contained in each part is not changed, so that it is sufficient only to delay the signal by taking the time period of the part (1F) as the one unit of delay time in this system.

The embodiment previously explained by referring to FIGS. 1c and 2 corresponds to the above mentioned practical case referred to in FIGS. 5c and 5d. In this way, 100 kinds of audio signals are converted into 150 kinds of sectional signals each of which is contained in a time slot having a time duration of 2F. Between every two adjacent time slots formed is a blank period of 1F. In order to multiplex these 150 kinds of signals, the original audio signal is modulated in the form of PCM and the signal obtained by this PCM is multiplexed in time division. Here, if the above delaying and combining process are performed within a frequency band in which the original audio signal is present, then 100 independent audio processors are required for processing the above mentioned delay and combination of the signals.

In order to reduce the number of such independent audio processors according to the present invention, two PCM-TDM apparatuses are employed for processing 50 audio signals in a PCM-TDM manner. The two outputs resulting from these two apparatuses by PCM-TDM processing can be used as two channels of signal $a_1$ and $a_2$ of FIG. 5. These outputs can be dealt with only two PCM-TDM type audio processors in a same way as the above, so that the configuration of the audio processor in which the three signals A, B and C are multiplexed can be fabricated without complexity.

Figure 6:
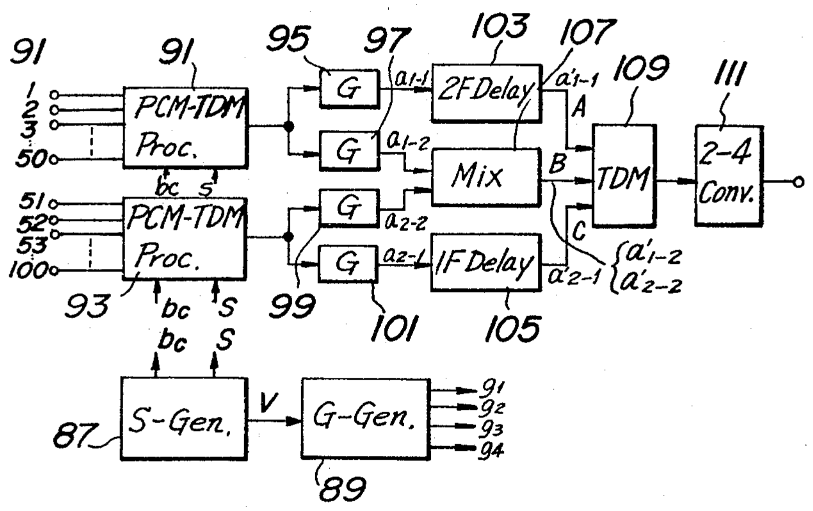
FIG. 6 is a block diagram of one embodiment of the transmitting apparatus for processing the audio signals by the principle of FIG. 5*c*.
Figure 9:
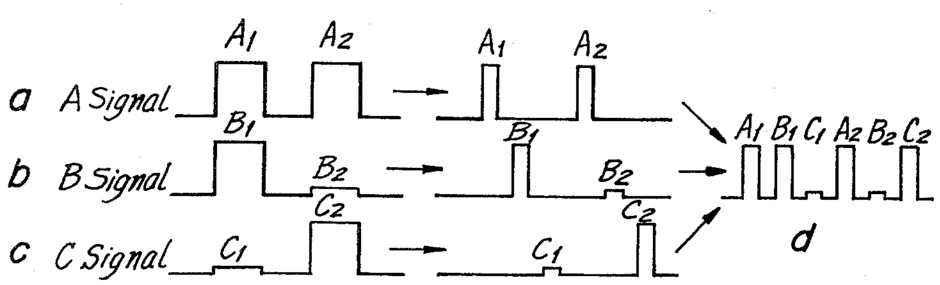
FIG. 9 shows waveforms for explaining the process of multiplexing three signals per bit unit in time division.
Figure 9A:
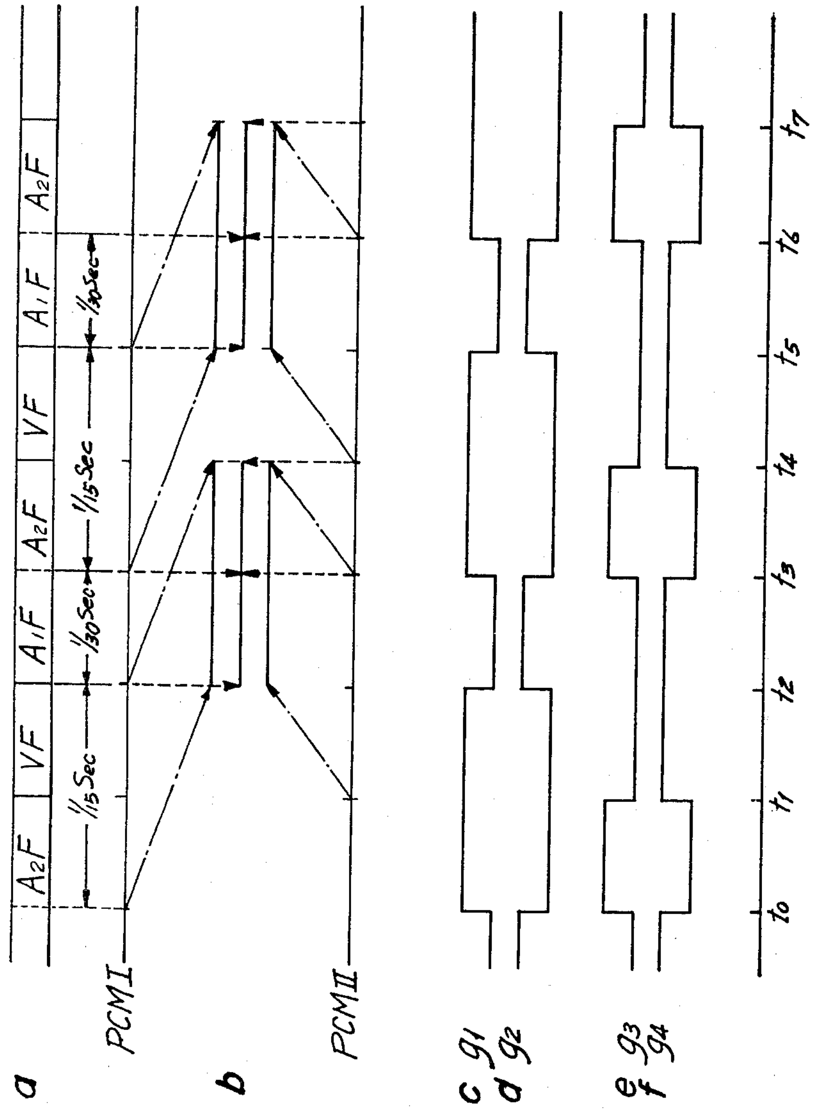
FIG. 9A shows timing of the gate signals applied to the gates of FIG. 6.

FIG. 6 shows an arrangement of the audio processor in the transmitting unit in the case of multiplexing audio signals in a PCM-TDM manner. This audio processor corresponds to said audio multiplexer 45, the A-D converter 47, the audio allocation processor 49 and the two-four level converter 51 in FIG. 2. In FIG. 6, 87 is a PCM timing signal generator for producing PCM frame synchronizing signal F, audio sampling signal S, bit clock *bc*, synchronizing signal V per TV frame and so on. 89 is a gate signal generator for producing gate pulses $g_1$, $g_2$, $g_3$ and $g_4$ with said synchronizing signal V from said generator 87. These gate pulses have such periods as shown in FIG. 4a. 91 and 93 are PCM-TDM processors in which audio signals are converted into PCM signals and then the PCM signals are multiplexed in time division. For example, 100 channels of audio signal are separated into two sets of channels, i.e., first to 50th channels and 51st to 100th channels. These two channel sets are processed to form PCM-TDM signals $a_1$ and $a_2$. Reference numerals 95, 97, 99 and 101 denote AND gate circuits. The gate 95 receives the $a_1$ signal and gate signal $g_1$ to gate said $a_1$ signal as shown in FIGS. 1c, 5c and 9a. That is, this gate is on during every two frame periods such as $t_0$–$t_2$, $t_3$–$t_5$ . . . , and this gate is off during the remaining one frame period such as $t_2$–$t_3$, $t_5$–$t_6$ . . . . The gate 97 receives the gate signal $g_2$ the polarity of which signal is reversed to that of signal $g_1$. This gate is off during two frame periods such as $t_0$–$t_2$ and is on during one frame period (such as $t_2$–$t_3$). The gate 99 receives the gate signal $g_3$. This gate signal $g_3$ is delayed by one frame period relative to the gate signal $g_1$, so that this gate 99 is on during two frame period (such as $t_1$–$t_3$) and is off during one frame period such as $t_3$–$t_4$ after one frame period compared with the gate 95. The gate 101 receives the gate signal $g_4$ which is delayed by one frame period relative to the gate signal $g_2$. This gate is off during two periods such as $t_1$–$t_3$ and is on during one period (such as $t_3$–$t_4$). These on and off timings are reversed to that of said gate 99. A delay circuit 103 is connected to said gate 95 to delay the output thereof by two frame periods. A delay circuit 105 is connected to said gate 101 to delay the output thereof by one frame period. The outputs of said gates 97 and 99 are connected to a mixing circuit 107. 109 is a time division multiplexer which receives the signal $a'_{1\text{-}1}$ from the delay circuit 103, the signal $a'_{2\text{-}1}$ from the delay circuit 105 and the signals $a'_{1\text{-}2}$, $a'_{2\text{-}2}$ from said mixing circuit 107 so as to multiplex these signals in time division. The output of this multiplexer 109 is supplied to a two-four level converter 111 in which a two level PCM signal is converted to a four-level PCM signal as described hereinafter.

The multiplexer 109 is composed of a shift register such as "9300" of Fairchild Company which has a plurality of parallel input terminals and one serial output terminal. Supplied to these parallel input terminals are said signals $a'_{1-1}$, $a'_{1-2}$, $a'_{2-1}$ and $a'_{2-2}$. By using a clock pulse train having a bit rate higher than said bit clock *bc* by three times, these signals $a'_{1-1}$, $a'_{1-2}$, $a'_{2-1}$ and $a'_{2-2}$ are read out sequentially from said serial output terminal.

For example, in case of 100 channels of audio signals, the audio signals of the first to 50th channels are pulse-code-modulated and multiplexed in time division by said first PCM-TDM processor 91. In this example, PCM processing is carried out by the sampling frequency of 10.5 KHz, 256 quantizing levels (eight digit numbers) and frame period pulse of eight digits, and pulse repetition frequency obtained by multiplexing 50 channels of audio signals in time division is 4.284 MHz.

Figure 7:
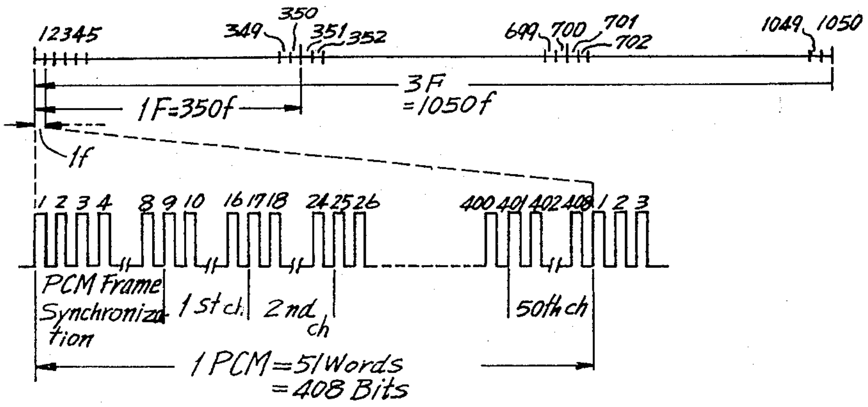
FIG. 7 shows signal formats for explaining the relation between television frame F and PCM frame *f* of the PCM-TDM output signal.

The remaining audio signals of the 51st to 100th channels are also processed by said second PCM-TDM processor 93 in a similar way. The two series of PCM pulse trains thus produced are arranged as shown in FIG. 7. As the sampling frequency of this example is chosen to be 10.5 KHz which is equal to two-thirds time of the horizontal synchronizing frequency of 15.75 KHz of a television signal, one television picture, i.e., 1 television frame (1F=525 scanning lines), is equal to 350f (*f* is a PCM frame). Accordingly, the audio signal corresponding to three television frames (3F) is equal to 1050f of PCM frames. The first PCM frames 700f corresponding to 2F are allotted to the signal $a_{1-1}$ or $a_{2-1}$ and the remaining frames 350f corresponding to 1F are allotted to the signal $a_{1-2}$ or $a_{2-2}$.

As to pulse arrangement within 1f of the PCM-TDM signal, as shown in FIG. 7, the first to eighth pulses are alloted to PCM frame synchronization, ninth to 16th pulses to the quantized pulse group corresponding to the first audio signal, 17th to 24th pulses to that corresponding to the second audio signal, and so forth, 400th to 408th pulses to that corresponding to the 50th audio signal. The same is applicable to the 51st to 100th audio signal. The above mentioned signals are derived from said PCM-TDM processors 91 and 93 of FIG. 6.

Figure 8:
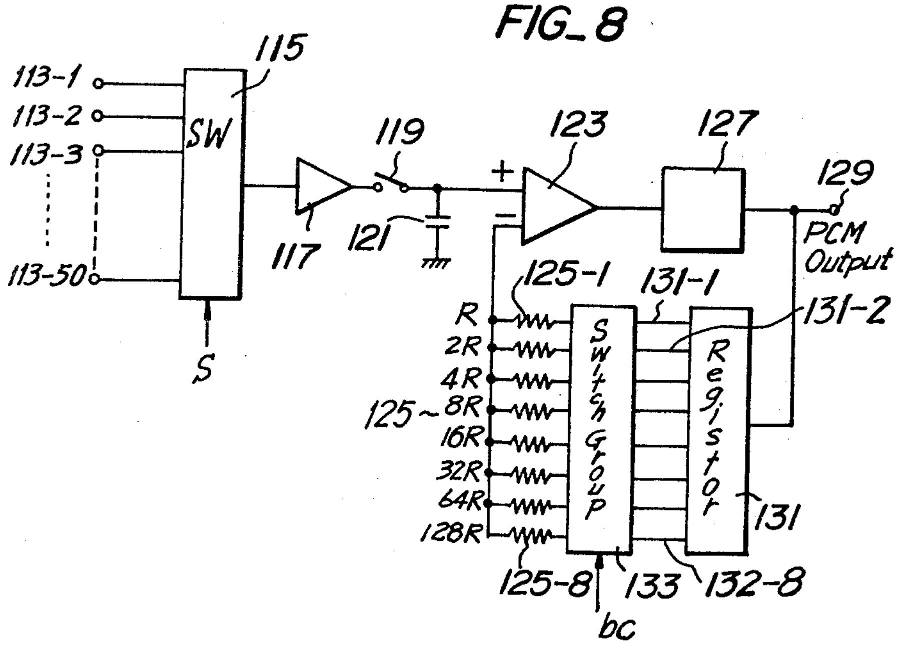
FIG. 8 is a schematic diagram of one embodiment of the PCM-TDM processor in FIG. 6.

The embodiment of said PCM-TDM processor will be explained in detail with reference to FIG. 8. In FIG. 8, reference numerals 113-1 to 113-50 denote audio input signal terminals, and 115 denotes a selecting switch for selecting one of said terminals 113-1 to 113-50. This switch 115 is driven by an audio sampling signal S so as to select sequentially one of said input terminals 113 and to sample the audio input signals sequentially. The whole selecting period of the switch 115 is equal to the inverse number of the sampling frequency of the audio signal, i.e., $(1/10.5)\times10^{-3}$ sec, so that the rate of changing each input terminal by the switch 115 is $((1/10.5)\times10^{-3})\ 1/50 = (1/525)\times10^{-3}$ sec. The sampled signal is amplified by an amplifier 117. The amplified output is applied to a sample hold circuit composed of a switch 119 and a capacitor 121. The continuous analogue output signal from the amplifier 117 is sampled by the switch 119 and the thus sampled signal is held (as a constant value) during a given period by the capacitor 121. The signal held by the capacitor 121 is applied to a differential amplifier 123 in which said sample-hold signal and the output from a weighting resistor circuit 125 are differentially amplified. The differential output signal from the amplifier 123 is applied to a polarity decision circuit 127. The output of this circuit 127 is supplied to a PCM output terminal 129 and to a register 131 for storing the output PCM signal temporarily. The register outputs are supplied to a switch group 133 and control this switch group. Said weighting resistor circuit has many weighting resistors 125-1 to 125-8, each of which has a resistance value of R, 2R, 4R . . . 128R, respectively, and is connected to said switch group 133. To this switch group 133 is supplied to a clock signal *bc*.

When the sample-hold signal is applied to the differential amplifier 123 for the first time, no output signal is obtained from the PCM output terminal 129. Accordingly, no signal is stored into the register 131, so that no signal is applied to the switch group 133. As the switch group 133 does not operate therein, the output of the weighting resistor circuit 125 is zero potential. In such condition, the differential amplifier 123 operates only as a usual amplifier, so that its output signal is proportional to its input signal. This output signal is supplied to the polarity decision circuit 127 in which is decided whether this output signal is so large or small as compared with a given decision level. The decision output thus obtained is the MSD (most significant digit) of the PCM output signal. This decision output signal is stored into the register 131. The PCM output signal stored for the first time, i.e., the MSD signal is applied through the first output 131-1 to the switch group 133 at the timing of the bit clock bc. If MSD=1, a constant voltage output is produced from the switch group 133 and is applied to said differential amplifier 123 by the resistor 125-1 of the weighting resistor circuit 125. If MSD= 0, the output of the weighting resistor circuit 125 remains zero potential. Here, for the description hereinafter, MSD is assumed to be 1. The constant voltage of the output of the circuit 125 can be varied by the voltage supplied from the switch group 133 and in this case, the constant voltage is a half of the maximum value of the output of said capacitor 121. Then the differential amplifier 123 amplifies the difference of the two inputs, so that this amplifier 123 produces a voltage shifted (or decreased) by a half of the maximum level. This voltage is compared with the decision level in the circuit 127 so as to produce a second PCM output, i.e., a second significant digit. This PCM output is stored in said register 131. This stored PCM output is applied through the second output 131-2 to the switch group 133 so as to produce a constant voltage by the resistor 125-2. This resistor 125-2 has a resistance value 2R which is larger than that of the resistor 125-1, so that the voltage produced by the resistor 125-2 is a half of the voltage produced by the resistor 125-1.

If the second PCM output is also 1, the voltage obtained from the weighting resistor circuit 125 becomes three-fourths (½ + ¼ = ¾) of the maximum voltage held by said capacitor 121. This newly obtained voltage is applied to the differential amplifier 123 and subsequently to the polarity decision circuit 127 so as to decide PCM sign. The same process is repeated until the register 131 is fully stored. After fully storing the register, PCM processing of one audio signal is completed. DUring this PCM processing the signal held by said capacitor 121 is required to be constant. Otherwise, the reference level of the early decision differs from that of the last decision, and this difference causes signal distortion. Hence, the signal from the capacitor 121 must be held at a constant value during PCM processing of one audio signal.

After the above PCM processing, said selecting switch 115 is changed to the next input terminal 113-2, and the audio signal of the second channel is passed to the amplifier 117. The output signal of the amplifier 117 is processed in the same way as above.

The same processing is applied to all of the 50 channels of the audio signal by sequentially changing the selecting switch 115.

For the above switches, amplifier and so on, usual integrated circuits can be employed, such as DG506 for the switch 115, G150 for the switch 119, DG501 for the switch 133, μA709 for the amplifiers 117 and 123, μA710 for the polarity decision circuit 127, 9300 for the register 131, and so on. (DG501 and 506 are products of Siliconix Inc. and the others are products of the Fairchild Co.)

In FIG. 6, the AND gates 95, 97, 99, 101 divide the signals $a_1$ and $a_2$ (shown in FIG. 5*c*) to the parts $a_{1\text{-}1}$, $a_{1\text{-}2}$, $a_{2\text{-}1}$ and $a_{2\text{-}2}$ and rearrange these parts as shown in FIG. 5*c*. That is, the part $a_{1\text{-}1}$ passed through the gate 95 is delayed by two frame periods (2F=2/30 sec.) by the delay circuit 103 so as to produce the signal A ($a'_{1\text{-}1}$). The part $a_{2\text{-}1}$ passed through the gate 101 is delayed by one frame period by the delay circuit 105 for producing the signal C ($a'_{2\text{-}1}$). The part $a_{1\text{-}2}$ passed through the gate 97 and the part $a_{2\text{-}2}$ passed through the gate 99 are combined by the mixing circuit 107 to produce the signal B. By shifting the parts $a_{2\text{-}1}$ and $a_{2\text{-}2}$ previously by one frame period which is equal to the time length of the part $a_{1\text{-}2}$ , the parts $a_{1\text{-}2}$ and $a_{2\text{-}2}$ can be connected without any time gap or without overlapping. These three signals A, B and C are processed only by delaying and rearranging, so that the pulse repetition frequency of these signals A, B and C is not varied and maintains 4.284 MHz. The gate pulses supplied to said AND gates 95, 97, 99 and 101 are shown in FIG. 9A.

These three signals A, B and C are applied to the time division multiplexer 109 in which the pulse width of each signal is compressed to one third of the original width and two thirds thereof is kept blank and reserved for the remaining two signals which are interposed into this blank period. By this compressing process, pulse repetition frequency becomes 12.852 MHz which is a value of three times of said frequency 4.284 MHz. This process is shown in FIG. 9. As clearly shown in FIG. 9, the pulses of said three pulse signal trains A, B and C are extracted from these pulse trains in time sequence of A, B and C, such as $A_1$, $B_1$, $C_1$, $A_2$, $B_2$, $C_2$ . . . and are arranged in series. The above process for obtaining the time division multiplexed output signal is clear from the pulse arrangement of FIG. 10.

Figure 10:
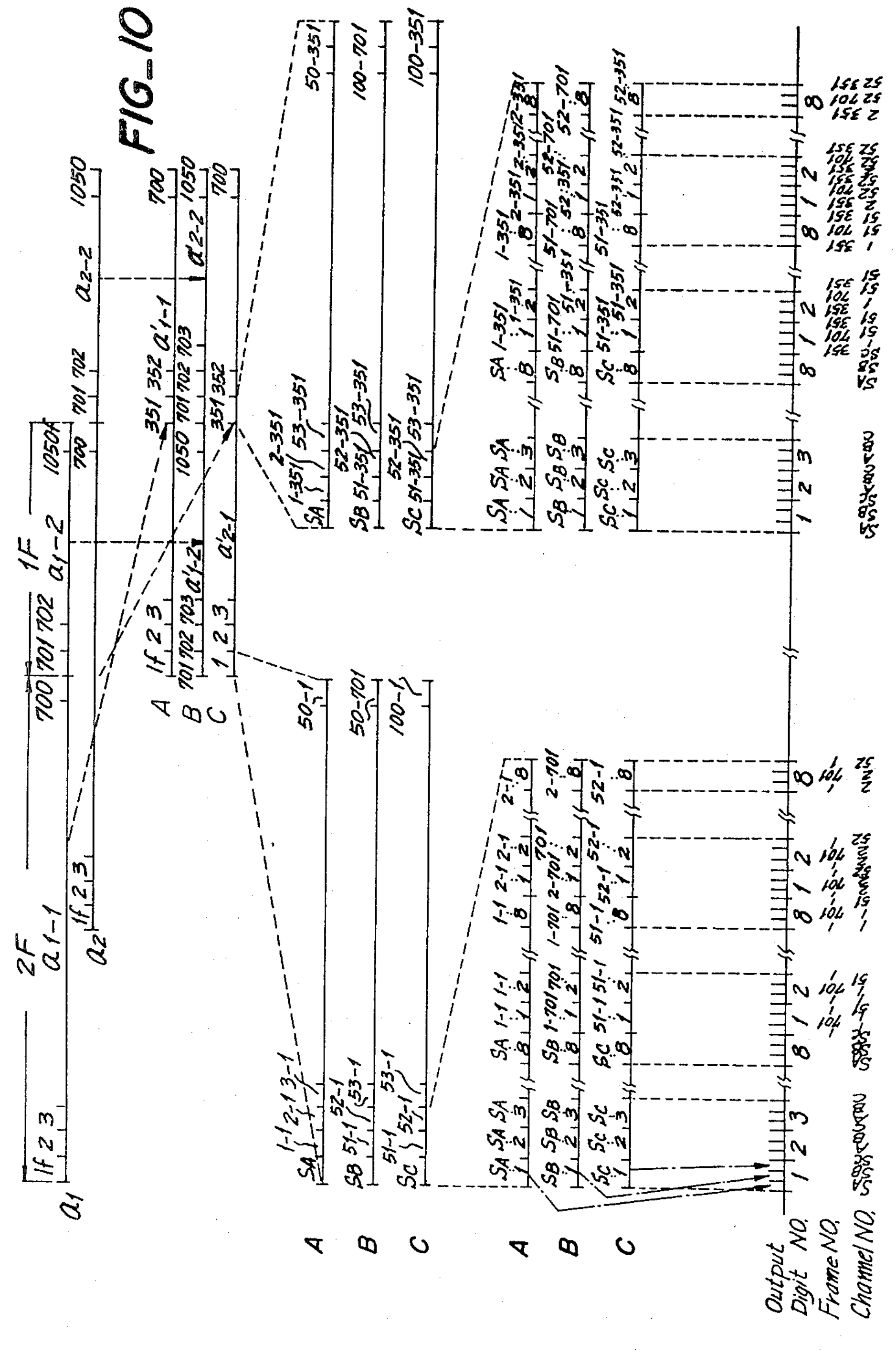
FIG. 10 shows a pulse arrangement of the actual multiplexed signal in the case of multiplexing three signals per bit unit in time division.

The first or top part of FIG. 10 shows two series of PCM-TDM signals $a_1$ and $a_2$ produced from said PCM-TDM processors 91 and 93. The second part of FIG. 10 shows said three signals A, B and C applied to said time division multiplexer 109. The signal A, B or C has 700 PCM frames (1f–700f), one of which has, as shown in the third part of FIG. 10, three synchronizing signals $S_A$, $S_B$ and $S_C$ occupying one PCM channel and audio PCM signals each of which has 50 PCM channels 1-1, 2-1 . . . 50-1 . . . 1-701, 2-701 . . . 50-701, 51-1, 52-1 . . . 100-1, 51-701, 52-701 . . . 100-701. The PCM channel in the third part of FIG. 10 has eight bits as shown in the fourth part of FIG. 10. The signals A, B and C thus composed are multiplexed in time division by the time division multiplexer 109 so as to derive the signal shown in the fifth or bottom part of FIG. 10 in which the respective bits of the signals A, B and C are alternately adjacent to each other in time division.

The multiplexed signal from the multiplexer 107 is converted to the four-level signal by the two-four level converter 111. The reason for converting the level of the PCM pulse signal will be explained hereinafter.

Figure 11:
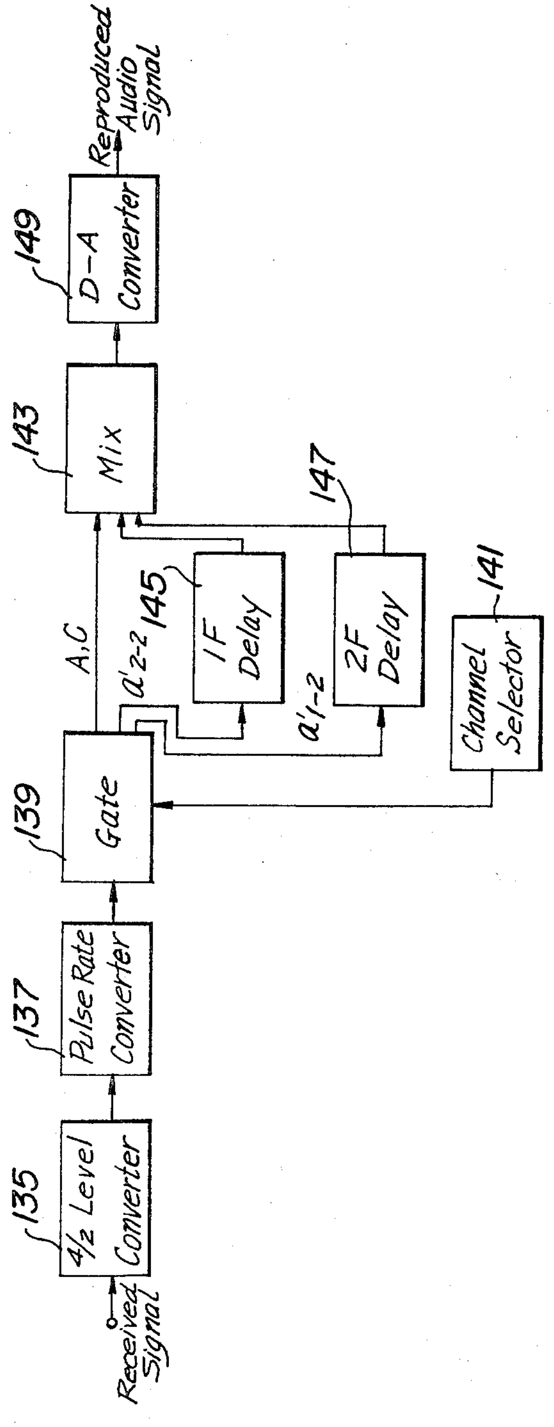
FIG. 11 is a block diagram of an embodiment of the receiving apparatus according to the present invention.

The apparatus for reproducing the original audio signal from the transmitted signal as shown in FIG. 5*d* will now be shown in FIG. 11. This apparatus corresponds to the audio reallocation processor 81 of FIG. 3.

A four-two level converter 135 receives the transmitted four-level PCM signal and converts it to two-level signal. The converted two-level signal is applied to a pulse rate converter 137 in which the received signals A, B and C are divided to one another again and the pulse rate of these signals is reduced to a third of the received one. The output signal from said converter 137 is applied to a channel gate 139 which is controlled by a channel selector 141 so as to extract the signal contained in a time slot corresponding to a desired channel. The gated signal from this gate is discriminated as to whether this gated signal corresponds to the signal A, B or C. In the case of this signal corresponding to the signal A or C, this gated signal is directly supplied to a mixing circuit 143 without passing through delay circuits 145 and 147. If the gated signal corresponds to the signal B, this signal is discriminated as to whether it corresponds to the signal $a'_{1\text{-}2}$ contained in the former half of the audio transmission period or to the signal $a'_{2\text{-}2}$ related to the latter half thereof. In case this signal corresponds to the signal $a'_{1\text{-}2}$, the gated signal is applied to the two-frame-period delay circuit 147. In case the signal corresponds to the signal $a'_{2\text{-}2}$, the gated signal is applied to the one-frame-period delay circuit 145. The outputs of these delay circuits 145 and 147 are connected to the mixing circuit 143. In this way, by the process already explained with reference to FIG. 4*d*, the original signal $a_1$ or $a_2$ is reproduced from the output terminal of said mixing circuit 143. As the reproduced signals $a_1$ and $a_2$ are still PCM digital signals, these signals are converted to analogue signals by a digital analogue converter 149 so as to reproduce the audio signal.

Figure 12:
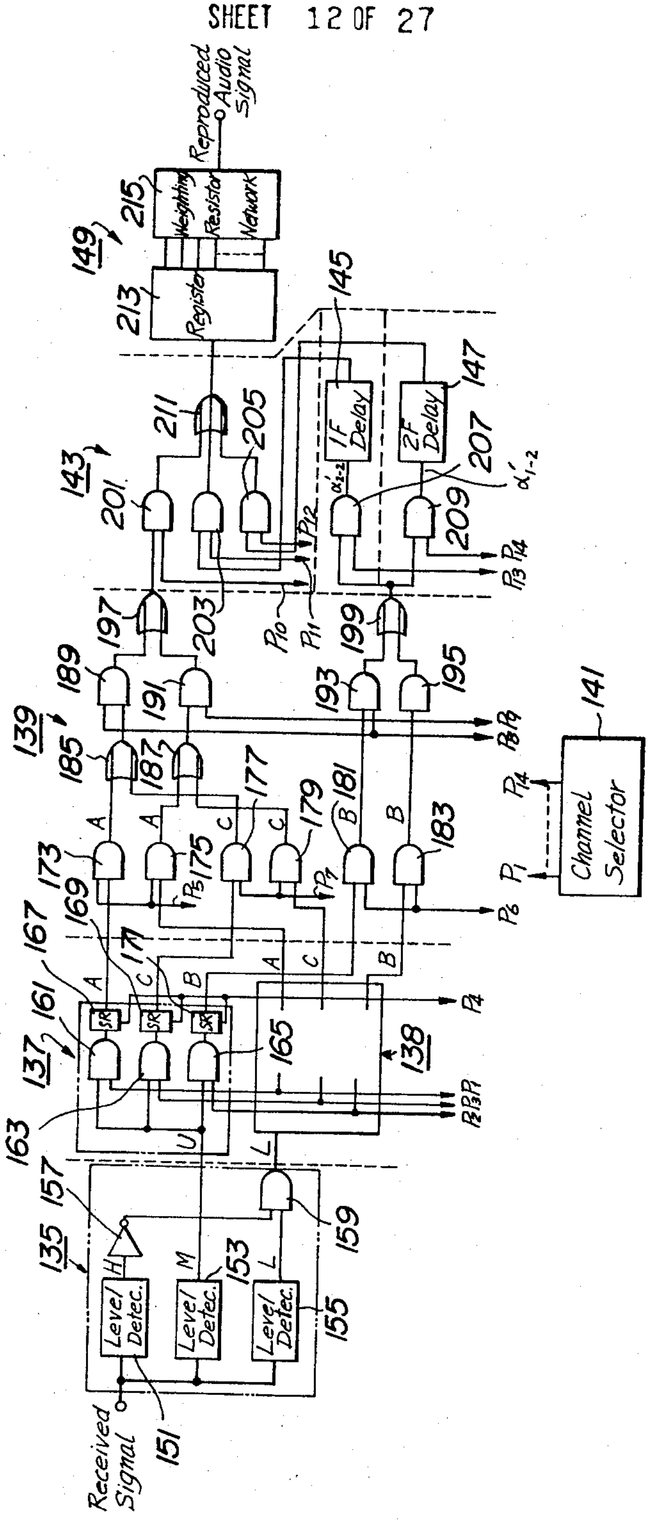
FIG. 12 is a logic circuit diagram of one embodiment of the receiving apparatus shown in FIG. 11, FIGS. 13*a*–13*h* and 14*a*–14*g* show waveforms of the signals at many parts of the receiving apparatus shown in FIG. 12.

The preferred embodiment of the reproducing apparatus of FIG. 11 is shown in FIG. 12. In FIG. 12, components corresponding to those already shown in FIG. 11 are denoted by the same reference numerals. Reference numerals 151, 153 and 155 denote level detectors which form the four-two level converter 135 together with an inverter 157 and an AND gate 159. The level detector may be composed of a comparator for a linear IC, such as μA710, SN710 of the Fairchild Co. The reference level for detecting input level of these detectors 151, 153 and 155 are respectively chosen to be five-sixths, one-half and one-sixth of the maximum input level so as to decide whether the input level corresponds to the high (H), middle (M) or low (L) level region, respectively. The inverter 157 and the AND gate 159 form a logic circuit for deciding the L level of two-level signal.

Figure 13:
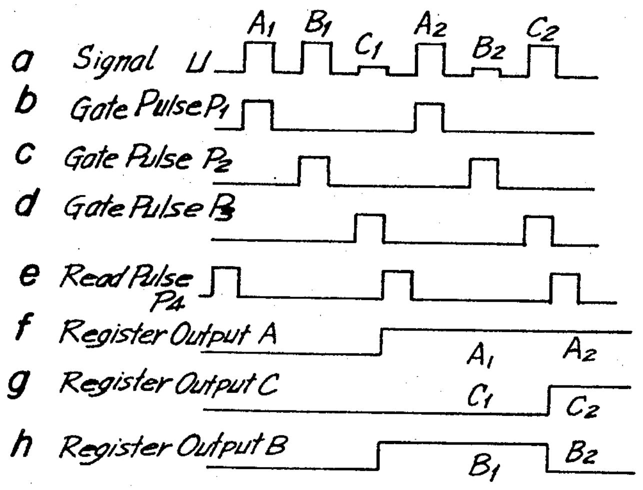
Figure 14:
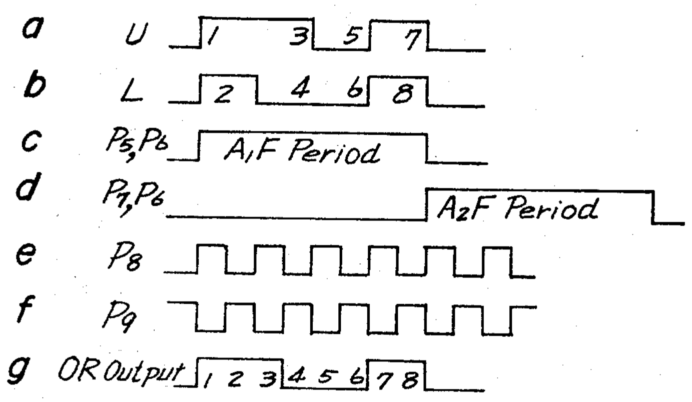

Two-level outputs U and L of the converter 135 are respectively applied to the following pulse rate converters 137 and 138, each of which comprises AND gates 161, 163, 165 and the time sequence of the operation of this converter is shown in FIG. 13. The outputs of the AND gates 161, 163, 165 are connected, respectively, to shift registers 167, 169 and 171. The contents of said registers 167, 169 and 171 are read out by the timing of the read pulse $P_4$ as shown in FIGS. 13*f*, 13*g* and 13*h*, and those outputs are applied to AND gates 173, 175, 177, 179, 181 and 183, with the connection mode shown in FIG. 12. The outputs of said AND gates 173 and 177 are applied to an OR gate 185, and the outputs of said AND gates 175 and 179 are applied to an OR gate 187. These gates 173 to 187 form the channel gate 139. The signal A is gated out by the timing of the gate pulse $P_5$ which has a time duration of one frame period corresponding to the time location of $A_1F$. The signal B is gated out by the timing of the gate pulse $P_6$ which occurs at the same timing as the gate pulse $P_5$ during the $A_1F$ period and which also occurs at the same timing as the gate pulse $P_7$ during the $A_2F$ period. The outputs of said OR gates 185 and 187 and said AND gates 181 and 183 are applied to AND gates 189, 191, 193 and 195. These AND gates together with the following OR gates 197 and 199 form a gate for mixing said two-level outputs U and L. The gates 189, 191, 197 and 193, 195, 199 are for changing the PCM pulse train which comprises one PCM word by two series of two-level signals of four bits to a pulse train forming one PCM word by eight bits of a two-level signal. These gates operate at the timing of the gate pulses $P_8$ and $P_9$ and the OR output such as shown in FIG. 14*g* is derived from the OR gate 197 or 199. The outputs of said OR gates 197 and 199 are applied to AND gates 201, 203, 205, 207 and 209. The AND gates 201, 203 and 205 together with the following OR gate 211 form said mixing circuit 143. To these AND gates 201, 203 and 205 are applied gate pulses $P_{10}$, $P_{11}$ and $P_{12}$. The gate pulse $P_{10}$ occurs during the periods of $A_1F$ and $A_2F$ of FIG. 1*c*. The gate pulses $P_{11}$ and $P_{12}$ are the reversed ones of the gate pulse $P_{10}$ and occur during the VF period. Even these pulses $P_{11}$ and $P_{12}$ have the same timing, but these pulses are produced at the PCM channel instructed by the channel selector 141. The outputs of said AND gates 207 and 209 are respectively applied to the delay circuits 145 and 147. The timing of the gate pulses $P_{13}$ and $P_{14}$ applied to the AND gates 207 and 209 respectively are equal to that of the gate pulses $g_3$ and $g_2$ of FIG. 9A, respectively. The outputs of these delay circuits are applied to said AND gates 203 and 205. The OR gate 211 combines the gated signal sequentially, such as connecting the signal B with the signal A or C of FIG. 5*d*. The output of the OR gate 211 is a serial PCM signal of the selected PCM channel and is applied to a register 213 which stores said OR output. The outputs of the register 213 are applied to a weighting resistor network 215 for digital to analogue conversion in parallel. Applied to the above many gates are desired gate pulses from the channel selector 141.

In the preceding explanation, the example of the video signal period being one frame and the audio signal period being two frames is dealt with. In addition, the present invention is not limited to that example, but the present invention can be applicable to the general case in which the audio frame period can be chosen to be *n* times of the time length of the video frame period.

If the audio frame period AF is chosen to be equal to the *n* times of the video frame period VF ($AF=nVF$), the audio signals corresponding respectively to the location of the video frame are sequentially delayed by $n$VF, $(n-1)$VF . . . 2VF and 1VF. Then, by combining sequentially each of the audio signals thus delayed, one audio channel is newly formed without any time blank. Thus, this new audio channel is added to the original audio channels during one audio frame period, so that there are $(n+1)$ audio channels in total, but the increment of the channels is slightly $(n+1)/n$.

Figure 16:
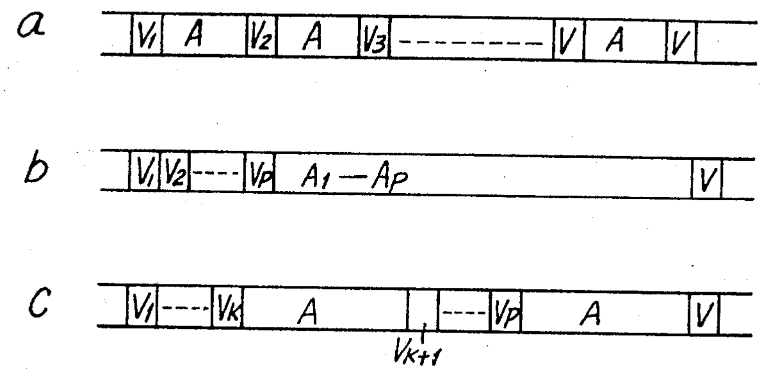
FIGS. 16*a*–16*c* are explanatory diagrams of three different methods of transmitting audio and video signals.

In general, for arranging the audio and video signals in the case of transmitting these signals in time division, there are three methods as follows.

a. Alternate transmission of audio and video signals (FIG. 16*a*).

b. Sequential transmission of audio and video signals in two separate groups (FIG. 16*b*).

c. Alternate transmission of pairs of partial audio and video signals allotted in two sequentially separated groups (FIG. 16*c*).

The transmission method of (a) type has an advantageous effect in that the capacity of the memory at the receiving end can be small because in this case only the audio signal during one frame period is required to be stored in that memory.

In the following, the transmission method (a) in which the video signal period is one frame and the audio signal is *n* frames will be explained in detail.

Figure 15:
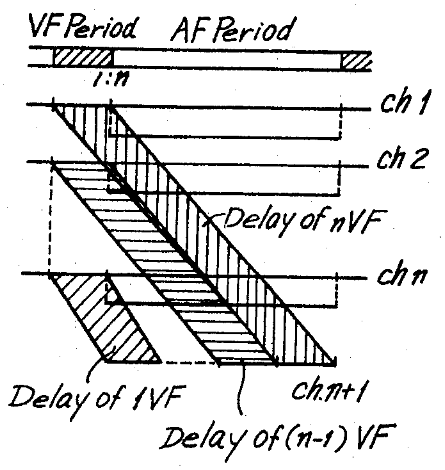
FIG. 15 shows a principle of the alternate transmission of audio and video signals.
Figure 17:
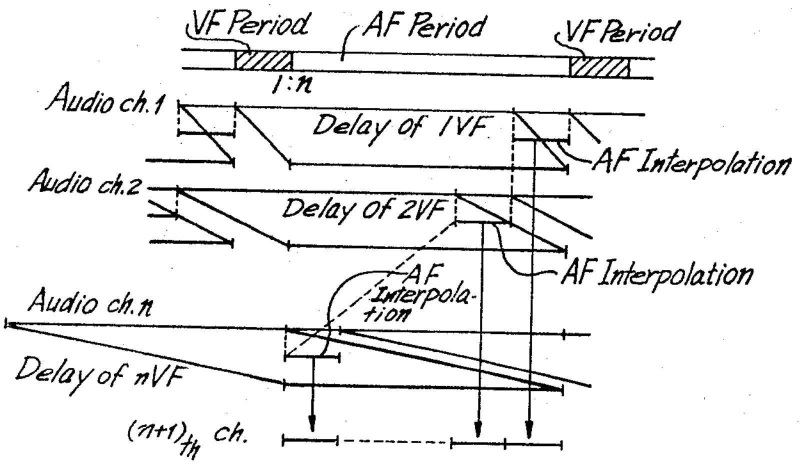
FIG. 17 shows a process of the actual signal combination according to the present invention.

FIG. 15 shows a principle of the above method (a) according to the present invention. If this method is employed as it is shown in FIG. 15, it is necessary to delay the part, which has not been delayed at the transmitting end, by the same time length as the delayed one, after receiving the transmitted signal at the receiving end, so that the signal amount to be delayed is fairly large. Accordingly, in case of $n=2$, the same process is taken as the process shown in FIG. 5*c*. That is, as shown in the FIG. 17, in case of the audio period being long by *n* times of the video period, like the process of FIG. 5*c*, possible amount of the audio signal is sufficiently delayed at the transmitting end, not at the receiving end. Namely, as to the audio signal in the first channel, the signal portion corresonding to the audio frame period is delayed by the time length equal to that of the video frame; as to the audio signal in the second channel, the signal portion corresponding to the audio frame period is delayed by the time length equal to the two video frames, and the same is applied to all of the *n* channels, i.e., as to the audio signal in the *n*th channel, the signal portion corresponding to the audio frame period is delayed by the *n* times of the video frames. The delayed signals are contained in the respectively desired channel.

Figure 18:
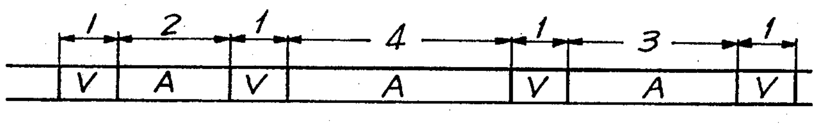
FIG. 18 shows one embodiment of the allocation of video and audio frames in case of the variable ratio of the transmission period between video and audio signals multiplexed in time division.

In the above embodiment, the value of *n* has been fixed but the present invention is not limited to such a case and the value of *n* can be variable as shown in FIG. 18. In the variable *n* system, it is required to vary the ratio between the time of the video and audio signal period to be transmitted, or to decide the optimum time location of the video frame to be allotted into the signal train. In order to take the above processing, there is provided a digital computer at the transmitting side so as to arrange the video and audio signals in the digital mode.

Figure 19:
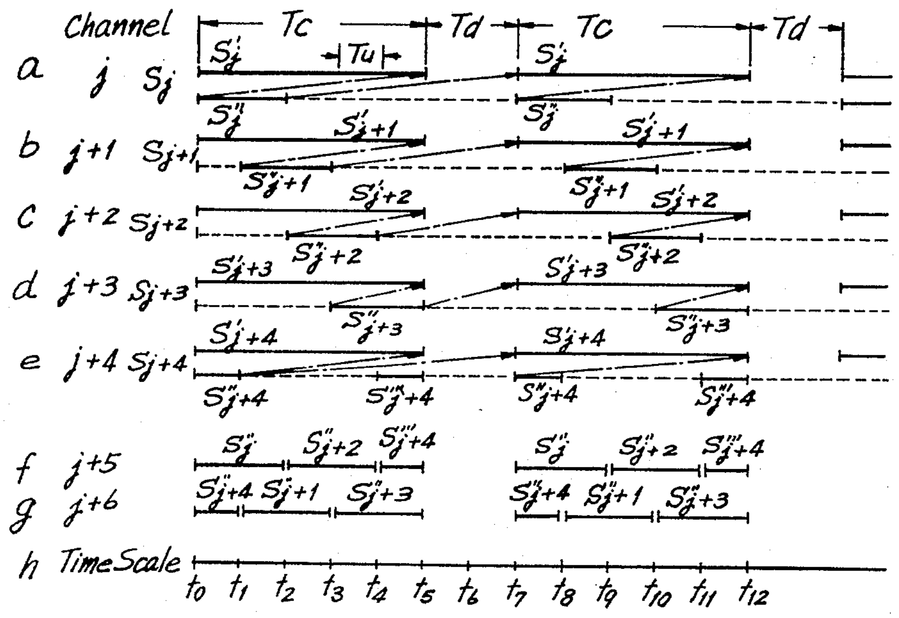
FIGS. 19*a*–19*h* are explanatory diagrams of one embodiment of signal processing according to the present invention.

Referring now to FIG. 19, another embodiment of signal processing according to the present invention will be explained, in which embodiment the ratio between the information signal transmitting period and the pause period is chosen to be an integer, and the pause period being *n* times (except $n=1$) of a unit period $T_t$.

In FIG. 19, the signal transmission period $T_c$ (corresponding to the audio signal period in the case of a still picture system) is 5 $T_u$ and the pause period $T_d$ (corresponding to the video signal period in the case of the still picture transmission system) is 2 $T_u$. Here, $S_j$, $S_{j+1}$, $S_{j+2}$, $S_{j+3}$ and $S_{j+4}$ are continuous signals, respectively, such as audio signals. The unit period $T_u$ is the given period determined by the most common divisor of the periods $T_c$ and $T_d$. In accordance with the examples of FIG. 1, this unit period $T_u$ corresponds to one television frame. The time scale of FIG. 19*h* is divided by the time length of one unit period such as $t_0, t_1, t_2 \ldots t_{12} \ldots$.

Now, if the five signals $S_j$ to $S_{j+4}$ are continuous, the signal portion of the first signal $S_j$ during the 5 $T_u$ period from $t_2$ to $t_7$ is delayed by 5 $T_u$ periods, as shown in FIG. 19*a*, so as to transmit the delayed signal as $S'_j$ during the $t_7$–$t_{12}$ period. The signal portions of the signal $S_j$ during 2 $T_u$ from $t_0$ to $t_2$ and from $t_7$ to $t_9$ directly transmitted as a signal $S''_j$ without delaying. The signal portion of the second signal $S_{j+1}$ from $t_3$ to $t_8$ is delayed by 4 $T_u$, as shown in FIG. 19*b*, so as to transmit the delayed signal as $S'_{j+1}$ during the $t_7$–$t_{12}$ period, and the signal portions of the signal $S_{j+1}$ from $t_1$ to $t_3$ and from $t_8$ to $t_{10}$ are directly transmitted as the signal $S''_{j+1}$ without delaying. The signal portion of the third signal $S_{j+2}$ during the $t_4$–$t_9$ period is delayed by 3 $T_u$, as shown in FIG. 19*c*, so as to transmit the delayed signal as $S'_{j+2}$ during the $t_7$–$t_{12}$ period, and the signal portions of the signal $S_{j+2}$ during the $t_2$–$t_4$ and $t_9$–$t_{11}$ periods are directly transmitted as the signal $S''_{j+2}$ without delaying. The signal portion of the fourth signal $S_{j+3}$ during the $t_5$–$t_{10}$ period is delayed by 2 $T_u$, as shown in FIG. 19*d*, so as to transmit the delayed signal as $S'_{j+3}$ during the $t_7$–$t_{12}$ period, and the signal portions of the signal $S_{j+3}$ during the $t_3$–$t_5$ and $t_{10}$–$t_{12}$ are directly transmitted as the signal $S''_{j+3}$ without delaying. The signal portion of the fifth signal $S_{j+4}$ during $t_2$–$t_7$ period is delayed by 5 $T_u$, as shown in FIG. 19*e*, so as to transmit the delayed signal as $S'_{j+4}$ during $t_7$–$t_{12}$ period, and the signal portion of the signal $S_{j+4}$ during the $t_0$ –$t_2$ and $t_7$–$t_9$ periods are divided into two signals; the signals corresponding to the former halves $T_u$ periods ($t_0$–$t_1$) and ($t_7$–$t_8$) are directly transmitted as the signal $S''_{j+4}$ during the $t_0$–$t_1$ and $t_7$–$t_8$ periods and the signals corresponding to the latter halves $T_u$ periods ($t_1$–$t_2$) and ($t_8$–$t_9$) being delayed by 3 $T_u$ so as to transmit as the signal $S'''_{j+4}$ during the $t_4$–$t_5$ period and $t_{11}$–$t_{12}$ periods.

The above processing is applied to each signal of the respective channel with the cycle of 7 $T_u$ period. In this manner, the intermittent signal train as shown in FIG. 19 is obtained. This intermittent signal train has a signal period $T_c$ (=5$T_u$) and pause period $T_d$ =2 $T_u$).

Therefore, in the case of transmitting five signals $S_j$–$S_{j+4}$, the signal $S'_j$ of $t_7$ to $t_{12}$ and the signal $S''_j$ interpolating the pause period $t_7$ to $t_9$ are transmitted for the signal $S_j$, the signal $S'_{j+1}$ of $t_7$ to $t_{12}$ and the signal $S''_{j+1}$ interpolating the pause period $t_8$ to $t_{10}$ are transmitted for the signal $S_{j+1}$, and the same is applicable to the signals $S''_{j+2}$ and $S''_{j+3}$. The signal $S_{j+4}$ is transmitted in the form of the signals $S'_{j+4}$, $S''_{j+4}$ and S'''j+4. Thus, in this transmission system, the channels *j*, *j*+1, *j*+2, *j*+3, *j*+4 transmit the signals $S'_j$, $S'_{j+1}$, $S'_j$+2, $S'_{j+3}$ and $S'_{j+4}$, respectively, whereas the combination of the interpolated signals $S''_j$, $S''_{j+2}$ and $S''_{j+4}$ is transmitted by the channel *j*+5 as shown in FIG. 19*f*, and the combination of the interpolated signals $S''_{j+4}$, $S''_{j+1}$ and $S''_{j+3}$ is transmitted by the channel *j*+6 as shown in FIG. 19g.

In this way, according to the present invention, the original continuous signals of five channels are converted into seven channels of intermittent signals repeated sequentially with the time ratio of 5:2 between the signal period and the pause period.

Figure 20:
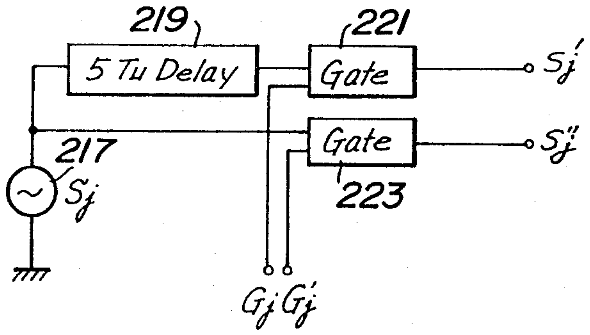
FIGS. 20, 21 and 22 are block diagrams embodying the signal processing of FIG. 19.

One embodiment of the circuit for obtaining the signals $S'_j$ and $S''_j$ from the original signal $S_j$ will be shown in FIG. 20. In FIG. 20, the reference numeral 217 denotes a signal source of the signal $S_j$, 219 denotes a delay circuit having delay time of 5 $T_u$, and 221 and 223 denote AND gates to which gate pulses $G_j$ and $G'_j$ are applied. The gate 221 is off during the 2 $T_u$ (=Td) period and is on during the other 5 $T_u$ (=Tc) period by the gate pulse $G_j$. Similarly, the gate 223 is on during the first 2 $T_u$ period and is off during the other 5 $T_u$ period.

As a result, the signal $S_j$ from the signal source 217 passes through the gate 223 during the 2 $T_u$ (i $t_7$–$t_0$) period, and passes through the gate 221 during the 5 $T_u$ period $t_7$–$t_{12}$ after being delayed by the 5 $T_u$ period by the delay circuit 219. For the delay circuit 219, many kinds of delay elements such as a ultrasonic delay line, magnetostriction delay line, spring delay line and so on can be used considering the amount of delay time. The same is applicable to the process for producing the signals $S'_{j+1}$, $S'_{j+2}$ , $S'_{j+3}$ and $S''_{j+1}$, $S''_{j+2}$, $S''_{j+3}$ from the respective signal $S_{j+1}$, $S_{j+2}$, $S_{j+3}$, by setting the delay time of the delay circuit as 4 $T_u$, 3 $T_u$, 2 $T_u$ respectively. Also the timing of the gate signal $G_j$ at which the gate 223 is on during the 2 $T_u$ period is shifted sequentially by 1 $T_u$.

Figure 21:
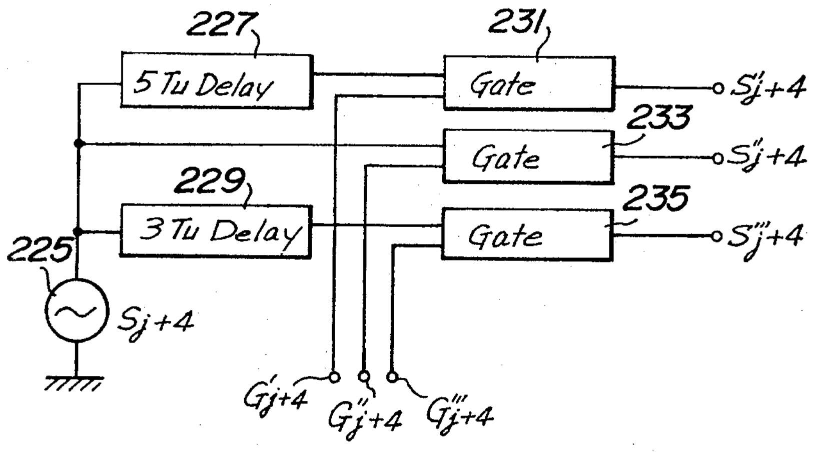

One embodiment of the circuit for obtaining the signal $S'_{j+4}$ and $S''_{j+4}$ from the original signal $S_{j+4}$ will now be illustrated in FIG. 21. Here, 225 is a signal source of the signal $S_{j+4}$, 227 is a delay circuit having delay time of 5 $T_u$, 229 is a delay circuit having a delay time of 3 $T_u$, and 231, 233 and 235 are AND gates. $G'_{j+4}$, $G''_{j+4}$ and $G'''_{j+4}$ are gate signals. The gate 231 is on during the $T_c$ period by the gate pulse $G'_{j+4}$, the gate 233 is on during the first 1 $T_u$ period of the $T_c$ period by the gate signal $G''_{j+4}$, and the gate 235 is on during the last 1 $T_u$ period of the $T_c$ period by the gate signal $G'''_{j+4}$. The signal $S'_{j+4}$ is derived from the gate 231, the signal $S''_{j+4}$ having a time duration of $T_c$ is derived from the gate 233, and the signal $S'''_{j+4}$ is derived from the gate 235.

Figure 22:
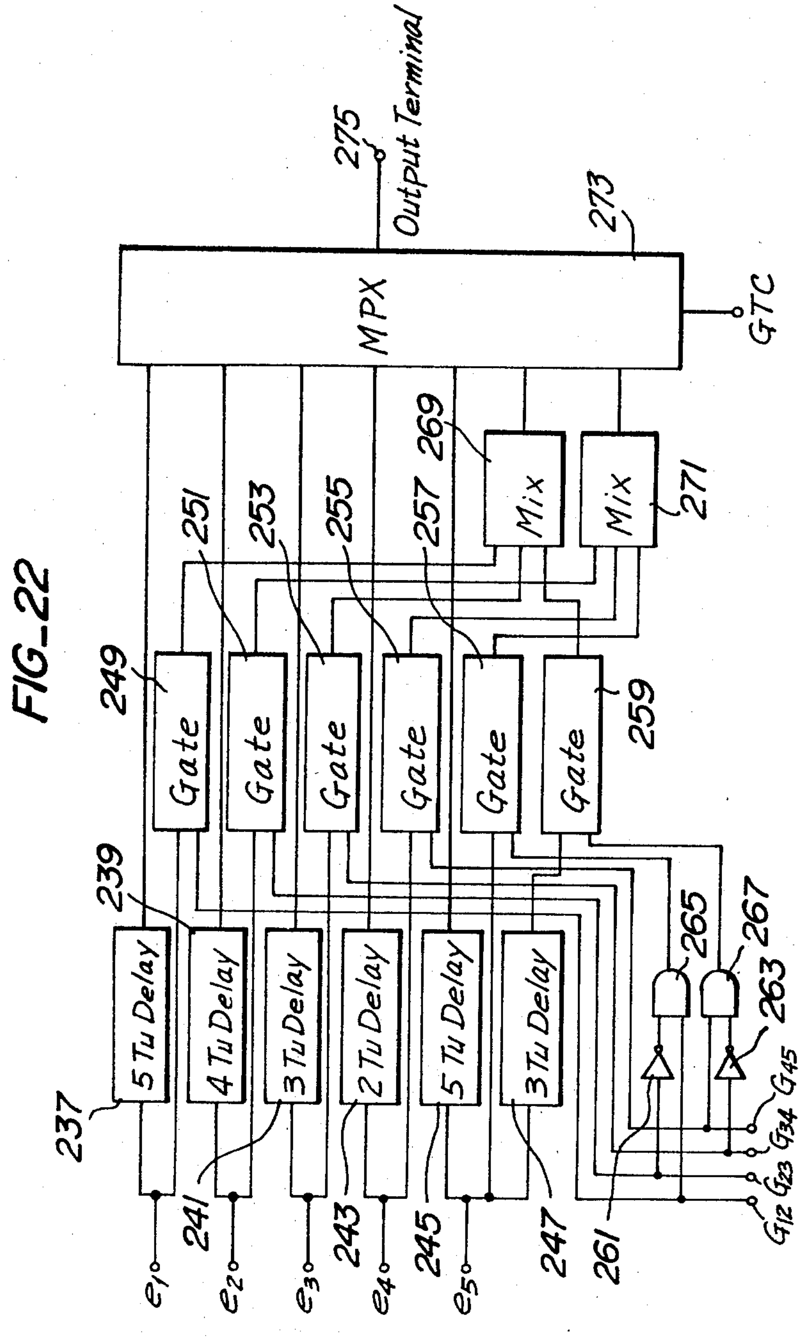

FIG. 22 shows a circuit arrangement in which said circuits shown in FIGS. 20 and 21 are combined. This arrangement can process the five signals $S_j$–$S_{j+4}$ in the manner shown in FIG. 19.

In FIG. 22, the reference numerals 237, 239, 241, 243, 245 and 247 denote delay circuits having a delay time of 5 $T_u$, 4 $T_u$, 3 $T_u$, 2 $T_u$, 5 $T_u$ and 3 $T_u$, respectively. 249, 251, 253, 255, 257 and 259 are AND gates, 261 and 263 are inverters, and 265 and 267 are AND gates. 269 and 271 are mixing circuits and 273 is a multiplexer. The gate signal $G_{12}$ occurs only during the first and second $T_u$ periods in the $T_c$ period, the gate signal $G_{23}$ occurs only during the second and third periods in the $T_c$ period, and the gate signal $G_{34}$ occurs only during the third and fourth periods in the $T_c$ perioc, and the gate signal $G_{45}$ occurs only during the fourth and fifth periods in the $T_c$ perioc. The gates 249, 251, 253, 255, 257 and 259 are respectively on during the first and second, second and third, third and fourth, fourth and fifth, first, and fifth $T_u$ periods in the $T_c$ period.

The AND gate 265 receives the gate signal $G_{12}$ and the inverted gate signal $G_{23}$ from the inverter 261 so as to supply a gate signal to the gate 257 during the first $T_u$ period. Similarly, the AND gate 267 receives the gate signal $G_{45}$ and the inverted gate signal $G_{34}$ from the inverter 263 so as to supply a gate signal to the gate 259 during the fifth $T_u$ period. The mixing circuits 269 and 271 respectively mix the signal $S''_j$, $S''_{j+2}$ and $S'''_{j+4}$ and the signal $S''_{j+4}$, $S''_{j+1}$ and $S''_{j+3}$, as shown in FIGS. 19*f* and 19*g*. The outputs of these mixing circuits 269 and 271, and the outputs of said delay circuits 237, 239, 241, 243 and 245 are combined by the multiplexer 273 in which the seven input signals transmitted by the seven channels *j*–*j*+6 are multiplexed, for example, in time or frequency division so as to obtain a multiplexed signal from the output terminal 275 of the multiplexer.

In this embodiment of FIG. 22, the outputs of the delay circuits 237, 239, 241, 243 and 245 are applied to the multiplexer without passing through any gate, so that the multiplexed output are not intermittent signals having pause periods $T_d$. Hereupon, in order to derive the intermittent signals existing only during the $T_c$ periods from the output terminal 275, a gate signal GTC is applied to said multiplexer 273 so as to pass the multiplexed signal during the $T_c$ periods only.

In the above embodiment of the present invention, the signal thus multiplexed has the ratio of 5:2 between the signal period and the pause period, but in any case of desired integral ratio between the signal period $T_c$ and the pause period $T_d$, the object of the present invention can be attained by determining the delay times of said delay circuits and the pulse widths of said gate pulses.

If the ratio between the time lengths of signal and pause periods is chosen to be $m:n$ ($m$ and $n$ are positive integers), then the amount of the combined signal, such as $S''_j$, $S''_{j+1}$ . . . for the signal interpolation is $n/m$, so that by determining $l=km$ (where $l$ being the number of the original signals and $k$ being an integer), these original signals can be effectively multiplexed in use of the new additional channels without having any blank period thereof. The number C of the series of signals to be multiplexed by the multiplexer 273 is given by the following equation:

$$C = (1+\frac{n}{m})l = (m+n)k \qquad (1)$$

$$K = \frac{l}{m}$$

where

In the all embodiments of the present invention already described above, at first the two channels of PCM-TDM signals are obtained from many channels of the original audio signals, and after this PCM-TDM process of the present invention is applied to those PCM-TDM signals.

Figure 23:
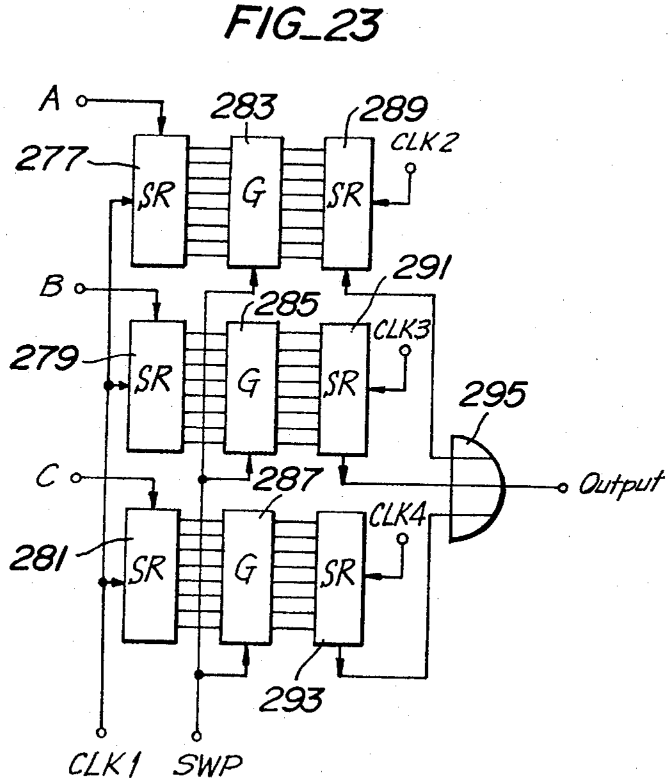
FIG. 23 is a block diagram of the apparatus embodying the method of multiplexing three signals per word unit in time division.
Figure 24:
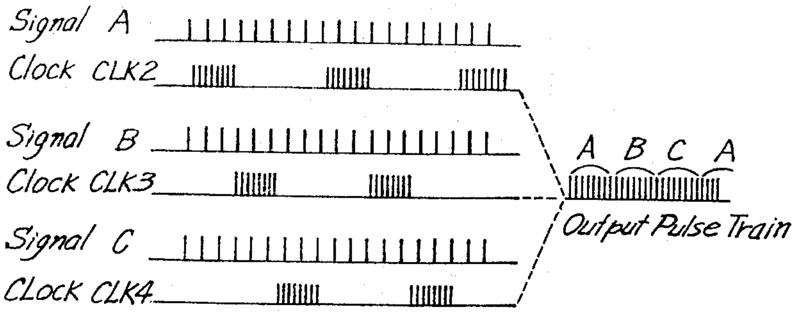
FIG 24 is a timing chart for explaining the apparatus of FIG. 23.

Hereinafter, another method of the multiplexing process will be explained. According to this method, the PCM signal is divided into many groups of eight pulses, since the sampled value is quantized by eight bits (i.e., $2^8$=256 levels). As the eight pulses comprise one word in this method, the PCM signal is processed with a word unit. For instance, in case of three PCM channels A, B, C, the PCM signals are repeated by word unit as A, B, C, A, B, C . . . . In addition, prior to the multiplexing process, the pulse repetition frequency is multiplexed by three times. One embodiment of this frequency multiplication and the timing chart thereabout is shown in FIGS. 23 and 24.

Figure 25:
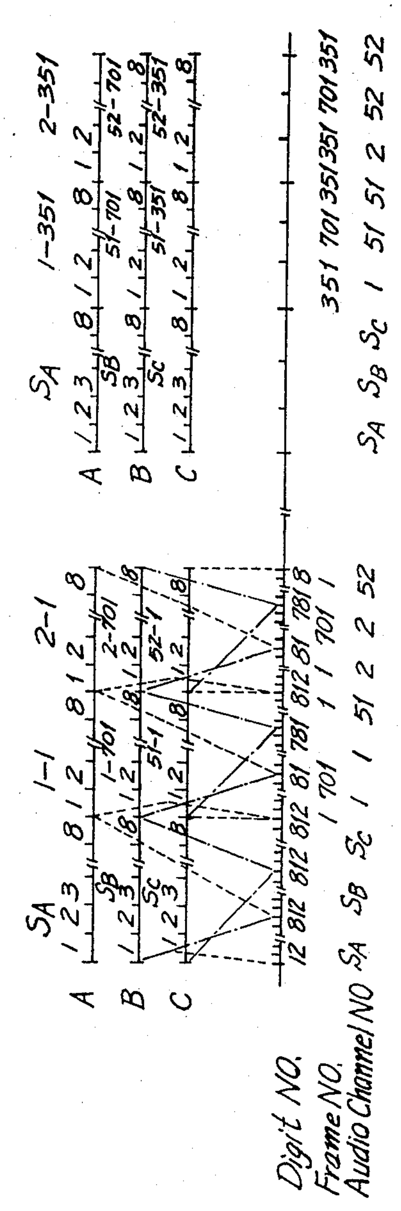
FIG. 25 shows the pulse arrangement of the actual output signal of the apparatus shown in FIG. 23.

The three channels of signals A, B and C are respectively applied to eight-bit shift registers 277, 279 and 281. These signals are respectively written into the corresponding registers in serial mode by a clock signal $CLK_1$ which is synchronized with the signals A, B and C. The signals thus written are applied to following gates 283, 285 and 287 in parallel mode. When these writings are completed, said gates 283, 285 and 287 become on by a switch pulse SWP applied thereto so as to transfer the outputs of said shift registers to further shift registers 289, 291 and 293. The signals stored in these shift registers 289, 291 and 293 are read out in serial mode by three kinds of clock pulses, $CLK_2$, $CLK_3$ and $CLK_4$, respectively, applied to said further shift registers. The frequencies of these clock pulses are three times higher than that of the clock pulse $CLK_1$ and these pulses are shifted to one another by eight bits, as shown in FIG. 24. The signals thus read out are combined by an OR gate 295 so as to produce such a pulse train as shown in FIG. 24. The pulse arrangement of the actual output signal is shown in FIG. 25. The pulse repetition frequency of this output from the OR gate 295 is 12.852 MHz which is similar to the frequency of FIG. 10.

In either case of FIG. 10 or 25, the pulse dealt with is a binary form, so that pulse repetition frequency becomes higher and that transmission frequency band becomes broader as the information to be transmitted increases. Accordingly, the binary pulse form is not suitably applied to the television broadcasting system in which the transmission frequency band is restricted to a given value. Considering the above, in order to improve the amount of the information to be transmitted, the multi-level pulse transmission system can be employed. In the case of the four level pulse, the pulse repetition frequency can be reduced to a half of 12.852 MHz, i.e., 6,426 MHz.

In order to form the four-level pulse, two continuous binary pulse trains or two independently formed binary pulse trains are suitably combined. In FIGS. 10 and 25, the pulse train of 12.852 MHz has been formed, so that the pulses are alternately extracted so as to combine with the remaining pulses. This method, however, has complicated processes for dividing and combining again the already multiplexed signal comprising of three original signals.

Thus, the method, in which the two binary signal trains of 6.426 MHz are formed independently and in which said binary signal trains are combined to form a four-level signal train, has advantageous effects in that the pulse rate does not become high and that the circuit arrangement of high speed is not required without any limit of circuit characteristics. For instance, the rate of the signal passing through said delay circuits 103 and 105 in FIG. 6 is 4.284 MHz. As a long delay is required for these delay circuits, it is considered that a crystal delay element and magnetostriction delay line can be used as these delay circuits. However, a crystal delay element is not sufficient because of its delay time, and a magnetostriction delay line is not sufficient because of its bandwidth. In order to avoid these disadvantages, the above method in which two series of 6.426 MHz signals are formed is preferable.

One embodiment according to the above method of the present invention will be explained, with reference to FIG. 26. The arrangement shown in FIG. 26 seems to have two arrangements of FIG. 6. But, in this embodiment, each of the PCM-TDM processors has not 50 but 25 inputs and then four PCM-TDM processors are used.

Figure 26:
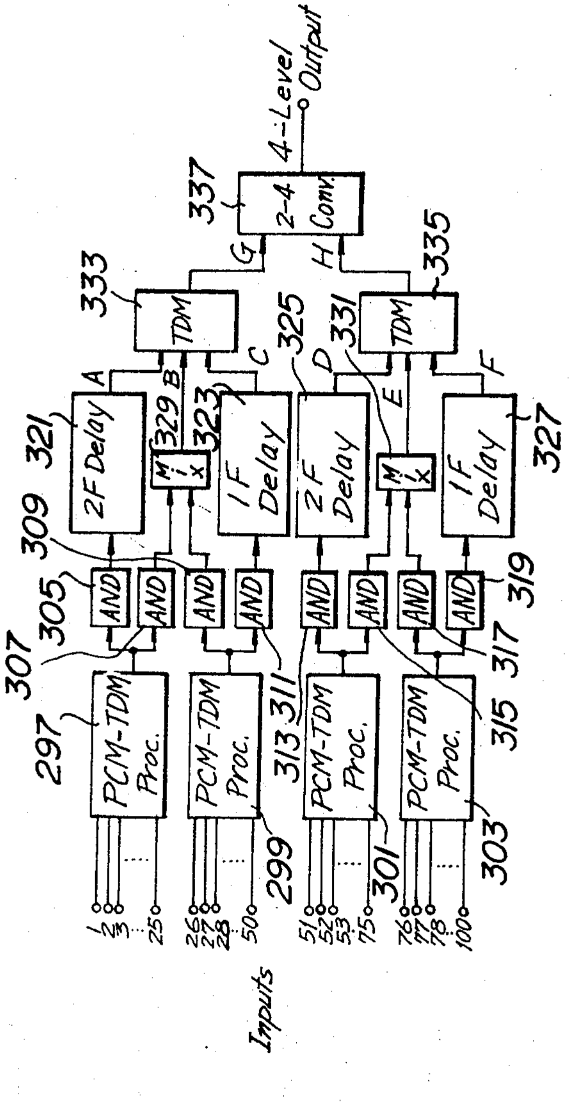
FIG. 26 is a block diagram of a modified embodiment of the transmitting apparatus according to the present invention.

In FIG. 26, reference numerals 297, 299, 301 and 303 denote PCM-TDM processors as mentioned above. In the case of providing eight-bit frame synchronization at said PCM-TDM processor, the frequency of the output PCM-TDM signal is 2.184 MHz. A pair of PCM-TDM processors 297 and 299, and 301 and 303 correspond to said processors 91 and 93 of FIG. 6. The outputs of these processors 297, 299, 301 and 303 are applied to AND gates 305, 307; 309, 311; 313, 315; 317, 319. The outputs of the AND gates 305, 311, 313 and 319 are respectively applied to delay circuits 321, 323, 325 and 327. The delay circuits 321 and 325 have a delay time of 2F, and the delay circuits 323 and 327 have a delay time of 1F. The outputs of said gates 307 and 309 are applied to a mixing circuit 329 and the outputs of said gates 315 and 317 are applied to a mixing circuit 331. Consequently, six channels of signals A, B, C, D, E and F are obtained from said delay circuits 321, 323, 325 and 327 and said mixing circuits 329 and 331. As the frequency of the pulses passing through said delay circuits is 2.185 MHz, the above magnetostriction delay line can be used as these delay circuits.

The signals A, B and C, and D, E and F are respectively multiplexed in time division by time division multiplexers 333 and 335, so that two series G and H of binary pulses of 6.552 MHz are derived from said multiplexers 333 and 335. These two pulse series G and H are supplied to a two-four level converter 337 in which these pulses are combined to form four-level pulses. The pulse arrangement of these pulse series G and H is similar to that of FIGS. 10 and 25, except for the difference of the pulse repetition frequency and the numbers of the audio signal channels.

The four-level pulse can be easily produced by a known method in which one of two synchronized pulses is doubled in amplitude relative to the other, and then the pulse thus amplified and the other pulse are added.

In addition to transmitting the audio signal after pulse-code-modulating it, according to the present invention, correlation signals can be collected at the vicinity of the same timing, by suitably choosing the channel arrangement, the signal distribution in converting the two-level signal into the four-level signal, and so on.

Figure 27:
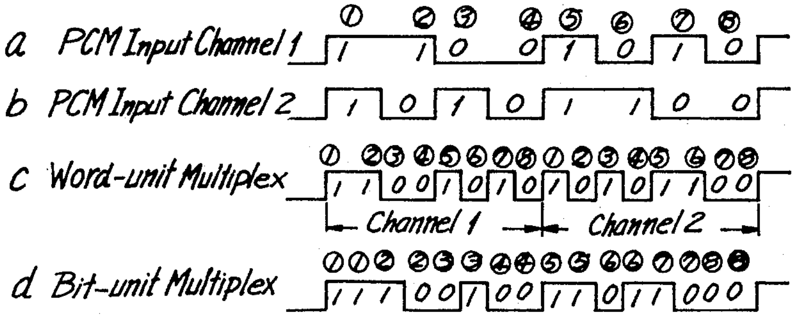
FIGS. 27*a*–27*d* are explanatory diagrams of the typical arrangement of PCM pulses.

Referring now to FIG. 27, the modified embodiment of the above case will be explained. In general, in the case of forming the PCM frame, two methods are known for arranging PCM words within a PCM frame, i.e., one is a method in which PCM signals are multiplexed per word unit, as shown in FIG. 27*a*, and the other is a method in which PCM signals are multiplexed per bit unit, as shown in FIG. 27*d*. Here, if there are two PCM input channels of signals as shown in FIGS. 27*a* and 27*b*, according to the former method of word-unit multiplexing, the digit pulses corresponding to one PCM word such as from digit ① to digit ⑧ occupy one time slot, as shown in FIG. 27*c*, whereas according to the latter method of bit-unit multiplexing, the digits of the same order of respective PCM words are arranged in the sequence of the PCM words, such as ① of the channel 1 and ① of the channel 2, ② of the channel 1 and ② of the channel 2, and so forth, as shown in FIG. 27*d*.

FIGS. 27*c* and 27*d* show the case of the two-level PCM, whereas in order to form the four level PCM, the problem of how to make the correspondence between the four- and two-level signals occurs, In such four-level PCM, the four-level signal can be formed by combining two independent binary signals, however, there is a disadvantage in that the error occurred in one pulse signal is apt to induce bad influences into the two four-level signals thus formed.

According to the present invention, the above disadvantage can be overcome by the improved transmission system described hereinafter.

In addition, as shown in FIG. 5*d*, the former half part $a'_{1\text{-}2}$ (named $B_1$ in the following explanation) of the signal B is delayed by one-fifteenth sec., so as to be connected after the signal A, and the latter half part $a'_{2\text{-}2}$ (named $B_2$ in the following explanation) of the signal B is delayed by one-thirtieth sec., so as to be connected after the signal C. Since these signal parts $B_1$ and $B_2$ are transmitted as the same signal B, it is required to distinguish them to one another.

The formation of the signal B is not limited to that shown in FIG. 5. For instance, the pulse density (i.e., pulse frequency) of these signal parts $B_1$ and $B_2$ may be chosen to be a half of the pulse density of the case shown in FIG. 5, and the pulse $a'_{2\text{-}2}$ of the signal part $B_2$ may be interposed between the pulses $a'_{1\text{-}2}$ of the signal part $B_1$. In such a case, however, the signal parts $B_1$ and $B_2$ cannot be clearly distinguished, and when receiving these signals it is necessary to expand the received signals on a time axis so as to reproduce the original pulse density, so that this method of pulse interposition is not effective. To the contrary, according to the method of FIG. 5, since the period of the audio frame AF is equal to the two periods of the video frame VF, the period of the video frame VF can be utilized as a timing for distinguishing the two signal parts $B_1$ and $B_2$ by using the middle instant of the AF period.

Thus, for the convenience of channel selection, it is desired that the PCM channel words relating to one audio signal maintain their position to be gathered at the same timing position or the vicinity thereof, even if the PCM channel words are multiplexed. So, according to this embodiment of the present invention, the words within the PCM frame are multiplexed by word-unit as shown in FIG. 27*c*, not by bit-unit of FIG. 27*d*. In order to form the four-level signal, this word-unit multiplex is processed in a modified manner. For instance, one word signal composed of the eight digits is divided into two sets of four digits which, as two binary signal series, are combined so as to form a four-level signal. By this processing, the word timings are gathered more closely, so that the pulse noise mixed into one word gives no influence to any other words. Consequently, the rate of word error is reduced, and, in addition, in case of the presence of coding error, the influence of this error is limited within the same word so that there occurs no interference between PCM channels.

In the two-four level conversion, it is preferable to employ the Gray code so as to receive either one of the binary codes in a correct manner even if the code error of the four-level signal occurs. The number of digits in one word is chosen to be an even number. The odd digits form the $2^1$ digit of the Gray code, and the even diits form the $2^0$ digit. In this case, the memory which can store only one bit is sufficient for the two-four level conversion in order to process the audio signal in real time.

Figure 28:
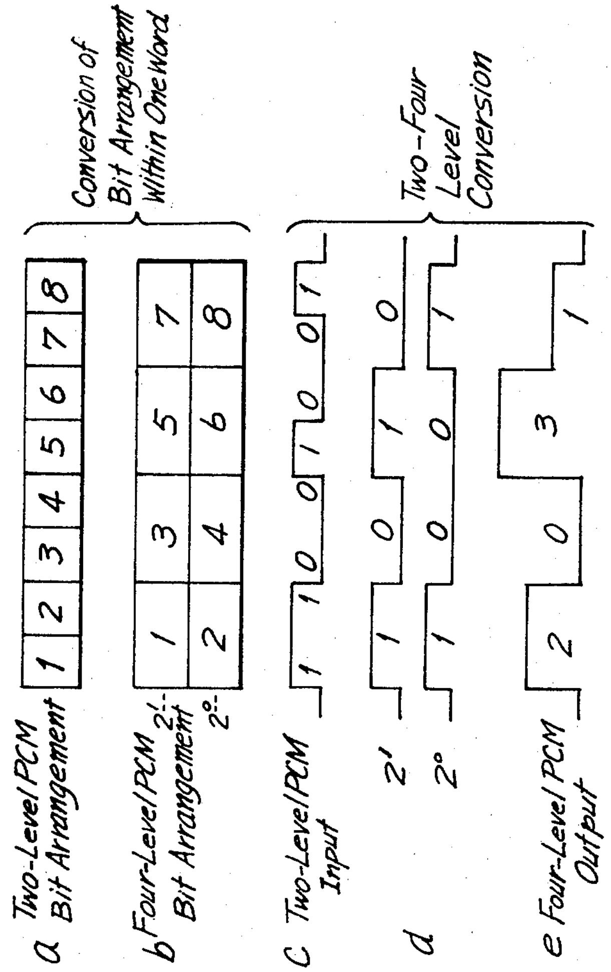
FIGS. 28*a* and 28*b* show the arrangement of bits within the PCM word of the present invention.
FIGS. 28*c* to 28*e* are explanatory diagrams of forming four-level pulses according to the present invention.

Accordingly, the bit arrangement within one word is preferably determined as shown in FIG. 28.

On the basis of the above principle, the signals A, B and C of FIG. 5 are multiplexed in time division in the form of a PCM signal.

If the signals A and C corresponding to the time length of the signal period are assumed to be a real signal R, and the signal B corresponding to the time length of the pause period is assumed to be a memory signal M, then the memory signal M can be formed, without any modification of the form of the original signal, only by gate means in which the signal parts $B_1$ and $B_2$ of one-thirtieth sec. are delayed by one-thirtieth sec. so as to combine these delayed signals. Alternatively, any other method can be utilized for the formation of the memory signal M. For example, the signal parts $B_1$ and $B_2$ may be alternately multiplexed in time division per word or bit unit. In this case, however, the word or bit rate of the signal part $B_1$ or $B_2$ is seen to become a half of the original rate, so that it is necessary to take the process of converting the word or bit rate of the received signal so as to reproduce the original rate.

To the contrary, if the signal is processed by each one-thirtieth sec. period, the received signal can be simply divided into the signal parts $B_1$ and $B_2$, and also it is easy to determine the memory time (which is the delay time for interpolating the audio signal corresponding to the duration of the video signal period) of the memory signal M.

For this sake, the signal transmission period AF of the audio signal is divided into two parts $A_1F$ and $A_2F$. The signal part $B_1$ is contained in the former half part $A_1F$ of the audio period AF, since this signal part $B_1$ relates to the signal A. The signal part $B_2$ related to the signal C is contained in the latter half part $A_2F$ of the audio period AF.

Figure 29:
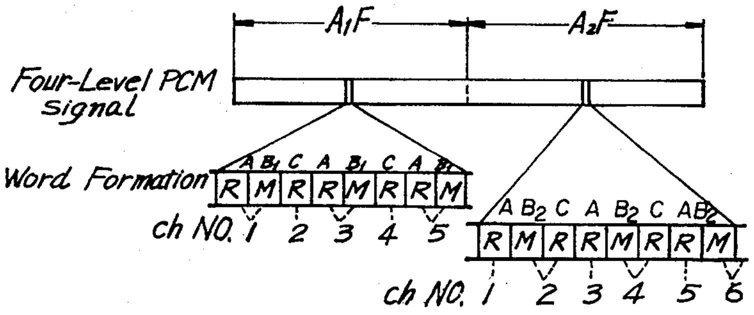
FIG. 29 shows the word arrangement in the PCM frame.

When multiplexing these signals A, B and C in time division, if the real and memory signals R and M of the same audio signal are located to be adjacent, it is easy to select a PCM channel, so that the signals A and $B_1$, and $B_2$ and C are allotted to adjacent words, respectively. Since the signal parts $B_1$ and $B_2$ have the signal contents at the same timing, the words are actually followed in the order of A, B and C, and the words thus formed are sequentially repeated as shown in FIG. 29.

In order to select the receiving channel, the gate pulse is formed in a manner that the period of the signals A and B or B and C is obtained. Consequently, the signal B is always gated out by accompanying with signal A or C, so that the formation of the word gate can be simplified, because it is sufficient only to distinguish the difference between the former and the latter halves of one-thirtieth sec.

Figure 30:
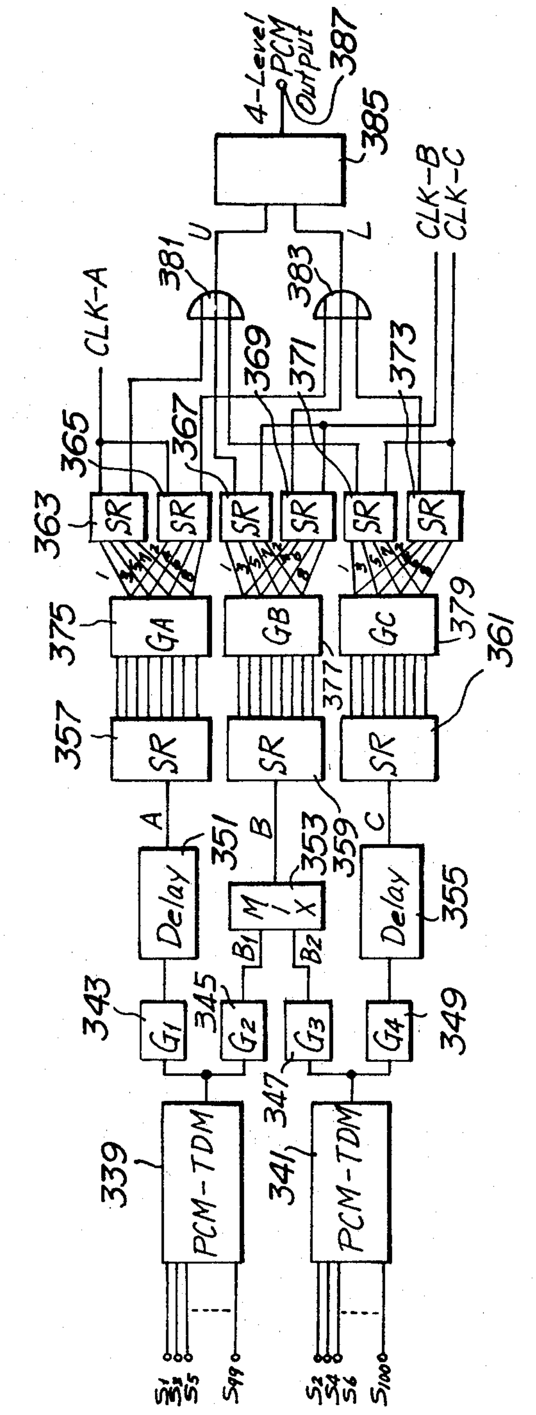
FIG. 30 is a block diagram of a further embodiment of the transmitting apparatus according to the present invention

One embodiment of the apparatus for processing the signal as described above is shown in FIG. 30. In FIG. 30, the input audio signals $S_1$–$S_{100}$ are divided into two groups of odd and even number signals. The two groups of audio inputs $S_1$, $S_3$ . . . $S_{99}$; $S_2$, $S_4$ . . . $S_{100}$ are respectively supplied to PCM-TDM processors 339 and 341. The PCM multiplexed outputs of these processors 339 and 341 are applied to AND gates 343, 345, 347 and 349. The output of the gate 343 is delayed by one-fifteenth sec. by a delay circuit 351, the outputs of the gates 345 and 347 are combined by a mixing circuit 353, and the output of the gate 349 is delayed by one-thirtieth sec. by a delay circuit 355. The outputs of these circuits 351, 353 and 355 are applied as the signals A, B and C to shift registers 357, 359 and 361, respectively. The detailed explanation of the arrangement and operation of FIG. 30 is quite similar to that already described with reference to FIGS. 5 and 27.

Next, in order to arrange the signals A, B and C in the form of FIG. 28, the signals A, B and C are applied to shift registers 357, 359 and 361 in serial form, respectively. The parallel outputs of these shift registers are transferred to shift register pairs 363, 365; 367, 369; 371, 373 through gates 375, 377 and 379, respectively. These gates 375, 377 and 379 serve for separating the bits within one word to odd and even number bits. For instance, the bits of odd numbers of the signals A, B and C are respectively transferred to the shift registers 363, 367 and 371, and the bits of even numbers of these signals are respectively transferred to the shift registers 365, 369 and 373. Here, the transfer timing of each shift register may be coincident with each other, or may be shifted so as to have some time margin.

When reading out the contents of said shift registers, the contents of both shift registers 363 and 365 are simultaneously read out by a clock pulse CLK-A, the contents of both shift registers 367 and 369 are simultaneously read out by a clock pulse CLK-B, and the contents of both shift registers 371 and 373 are also simultaneously read out by a clock pulse CLK-C. The outputs thus read out from the shift registers 363, 367 and 371 are supplied to an OR gate 381, and the outputs from the remaining shift registers 365, 369 and 373 are supplied to an OR gate 383. The OR output signals U and L are obtained from said OR gates 381 and 383, respectively.

Figure 31:
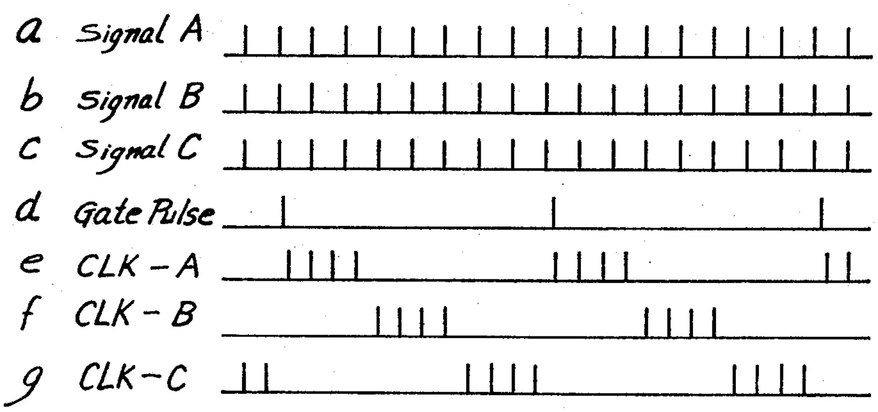
FIGS. 31*a*–31*g* are timing charts of the bit arrangement within the word obtained by the transmitting apparatus shown in FIG. 30.

FIGS. 31*a*, 31*b* and 31*c* show respectively the timing of the signals A, B and C which occurs simultaneously in synchronism and are applied to said shift registers 357, 359 and 361. FIG. 31*d* shows the gate pulse applied to these shift registers, and FIGS. 31*e*, 31*f* and 31*g* show the timing of the clock pulses CLK-A, CLK-B and CLK-C which occur at the different instants and the clock period of each clock pulse is two-thirds of said signals A, B and C stored in said shift registers 357, 359 and 361.

Consequently, as shown in FIG. 29, the signals are arranged by the sequence of A, $B_1$, C, A, $B_1$, C . . . at the former half period $A_1F$ of the audio signal, and the signals are arranged by the sequence of A, $B_2$, C, A, $B_2$, C . . . at the latter half period $A_2F$ of the audio signal. That is, in the form of real and memory signals R and M, the signals are arranged by the sequence of R, M, R, R, M, R . . . at said each half period. As is clear from the above explanation, the memory signal M at the former half period $A_1F$ of the audio signal and the real signal R preceding by one time slot relative to said memory signal M are contained in the same channel, and the memory signal M at the latter half period $A_2F$ of said audio signal and the real signal R after one time slot relative to said memory signal M are contained in the same channel, so that at the receiving end the circuit arrangement which has delay and gating circuits so as to separate the received signal and to reallocate them can be manufactured more simply.

The odd bits U and the even bits L of respective words within each audio signal are obtained from said OR gates 381 and 383 in FIG. 30, respectively. Both the outputs U and L of these OR gates are supplied to a four-two level converter 385 so as to form four-level signals by combining these signals U and L as already shown in FIGS. 28*c*, 28*d* and 28*e*. The four-level PCM output signal is derived from an output terminal 387 of said two-four level converter 385. The two-four level conversion is executed by the converter 385 as follows. Firstly, the inputs U and L are converted to a digital signal of a Gray binary code from the input digital signal of a natural binary code, and secondly the digital signal of the Gray binary code is converted to a four-level signal. The logical conversion of the signals U and L is given by the following equation $X = U$, and $Y = U \cdot \bar{L} + \bar{U} \cdot L$.

The binary code after this conversion is expressed as (X, Y).

Figure 32:
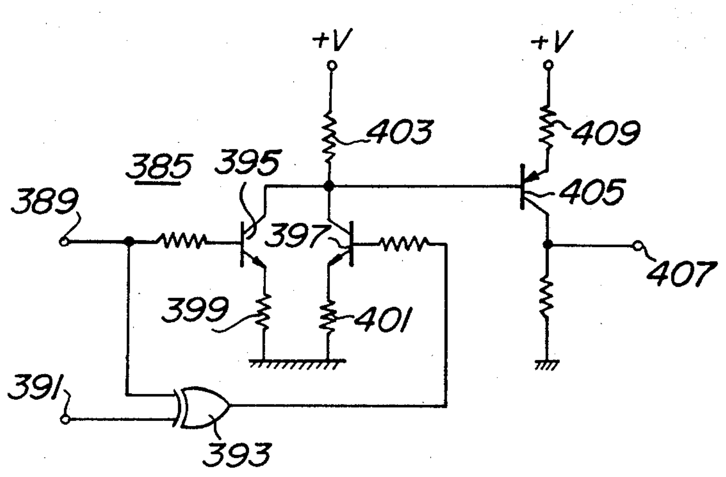
FIG. 32 is a circuit diagram of one embodiment of the two-four level converter of FIG. 30.

One embodiment of said converter 385 is shown in FIG. 32. In FIG. 32, reference numerals 389 and 391 denote input terminals to which said signals U and L are applied, respectively. 393 is an exclusive OR gate. Transistors 395 and 397 comprise a current adder. The emitters of these transistors are connected to resistors 399 and 401. The resistance value of the resistor 401 is twice that of the resistor 399. The collectors of these transistors are commonly connected to a voltage source +V through a collector resistor 403. The bases of said transistors 395 and 397 are coupled respectively to the input terminal 389 and the output terminal of the exclusive OR gate 393. The collectors of the transistors 395 and 397 are connected to the base of an output transistor 405. The four-level output is derived from the output terminal 407 connected to the collector of said transistor 405. The emitter of this transistor is connected to the voltage source +V through an emitter resistor 409.

As the resistance value of the resistor 401 is twice that of the resistor 399, the current flowing through the collector resistor 403 in the case of the input voltages of said transistors 395 and 397 being 1 and 0 respectively is twice that in case of the input voltages of said transistors 395 and 397 being 0 and 1 respectively.

The converter 385 thus formed operates as follows. When the input signals U and L are 0, the voltages applied to the bases of said transistors 395 and 397 are 0, so that the voltage produced at the output terminal 407 is 0. In the case of U=0 and L=1, the transistor 395 remains in the cutoff state, and the transistor 397 is conductive because of the exclusive OR output being 1, so that the voltage obtained from said output terminal 407 is 1. In the case of U=1 and L=0, the transistors 395 and 397 are on because of the exclusive OR output being 1, so that the current through the resistor 403 is the sum (3) of the current (1) through the transistor 397 and the current (2) through the transistor 395. Consequently, the voltage obtained from the output terminal 407 is 3. When the input signals U and L are 1, the exclusive OR output is 0, and the transistor 395 is on, so that the current through the resistor 403 is the current (2) through the transistor 395. Consequently, the voltage derived from the output terminal 407 is 2.

The outputs of the converter 385 are summed up as shown in the following Table.

Table

| Input U | Input L | Output |
|---|---|---|
| 1 | 1 | 2 |
| 1 | 0 | 3 |
| 0 | 1 | 1 |
| 0 | 0 | 0 |

In the above embodiments of the present invention, the transmission system of this invention has been illustrated and described for transmitting still pictures and its related sounds in a time division mode. However, the transmission system according to the present invention is not limited to such a still picture and sound transmission system, and it may be used to transmit television pictures and fascimile signals, or various signals such as remote control signals, audio signals, and fascimile signals in the form of PCM, PTM, PWM or PAM signals. In addition, it will now be apparent to those skilled in the art that changes and modifications may be made without departing from the invention in its broader aspects, and it is the intention, therefore, in the appended claims to cover all such changes and modifications as fall within the true spirit of the invention.

What is claimed is:

1. A signal transmission system for transmitting a plurality of signals through a transmission path having a plurality of channels provided alternately with signal and pause periods at a predetermined time sequence, comprising, at the transmitter, gate means for dividing each series of signals among said plurality of signals into first signal parts the period of each of which is equal to said signal period and second signal parts the period of each of which is equal to said pause period, delay means for delaying either one of said first and second signal parts, signal combining means for forming a second signal series by combining sequentially only said second signal parts of said series of signals, and signal transmission means for transmitting a first signal series corresponding to said first signal parts and said second signal series obtained from said signal combining means by respective channels, and further comprising, at the receiver, signal reproducing means for reproducing the first and second signal parts selected from the received signal series, delay means for delaying either one of said first and second signal parts which has not been delayed at the transmitter, and signal combining means for combining sequentially the delayed signal parts obtained from said delay means of the receiver with the other signal parts.

2. A signal transmission system as claimed in claim 1, wherein said transmitter further comprises signal multiplexing means for multiplexing said plurality of signals so as to form a plurality of series of signals, the number of which series depends upon the ratio of time length between said signal and pause periods, and wherein said receiver further comprises gate means for selecting a desired signal part from a signal series received through a desired channel.

3. A signal transmission system as claimed in claim 1, wherein said transmitter comprises a first delay means for delaying the first signal part of the first series of signals among said plurality of signals by a delay time equal to said pause period, a second delay means for delaying the first signal part of the second series of signals among said plurality of signals by a delay time equal to twice said pause period, and so forth, an *n*th (*n* being a positive integer) delay means for delaying the first signal part of the nth series of signals among said plurality of signals by a delay time equal to n times said pause period, means for combining sequentially said second signal parts of said n series of signals so as to form the second signal series, and signal transmission means having a plurality of channels for separately transmitting *n* first signal series corresponding to said respective first signal parts with said second signal series obtained from said combining means through respectivie channels, and wherein said signal reproducing means of said receiver reproduces the *n* first signal parts and the second signal series selected from the received signal series, and further said receiver comprising gate means for dividing said second signal series into *n* second signal parts, a first delay means for delaying the second signal part of the first series of signals by a delay time equal to said pause period, a second delay means for delaying the second signal part of the second series of signals by a delay time equal to twice said pause period, and so forth, an *n*th delay means for delaying the second signal part of the *n*th series of signals by a delay time equal to *n* times said pause period, and signal combining means for combining sequentially the *n* delayed second signal parts from said delay means with the *n* first signal parts, respectively.

4. A signal transmission system as claimed in claim 3, wherein said transmitter comprises:

time-division multiplexing means for producing a plurality of time-division multiplex signals, the number of which depends upon the ratio of time length between said signal and pause periods, a first delay means for delaying the first signal part of the first time-division multiplex signal by a delay time equal to said pause period, a second delay means for delaying the first signal part of the second time-division multiplex signal by a delay time equal to twice said pause period, and so forth, an *n*th (*n* being a positive integer) delay means for delaying the first signal part of the *n*th time-division multiplex signal by a delay time equal to *n* times said pause period, means for combining sequentially said second signal parts of said *n* time-division multiplex signals so as to form the second signal series, and signal transmission means having a plurality of channels for separately transmitting *n* first signal series corresponding to said respective first signal parts with said second signal series obtained from said combining means through respective channels, and wherein said signal reproducing means of said receiver reproduces the *n* first signal parts of *n* time-division multiplex signals and the second signal series selected from the received signal series, and further said receiver comprises gate means for selecting a signal transmitted through a desired channel, delay means for delaying the second signal part within said selected signal by a delay time corresponding to the selected channel, and signal combining means for combining sequentially the first signal part within said selected signal with the delayed second signal part obtained from said delay means.

5. A signal transmission system as claimed in claim 4, wherein said time-division multiplexing means of said transmitter multiplexes each of the signals to be transmitted by a plurality of channels in time-division so as to form binary PCM signals, each of which has many words composed of the even numbers of digits, and said transmitter further comprises means for combining the adjacent digits of odd and even numbers and for converting the combined signal into four-level PCM signals to be transmitted, and wherein said receiver comprises means for converting the four-level PCM signals reproduced by said signal reproducing means into two-level binary PCM signals.

6. A signal transmission system as claimed in claim 4, wherein said time-division multiplexing means has means for arranging sampled signals of said multiplexing means in a manner that said first and second signal parts are adjacent to one another.

7. A signal transmission system (referred to FIG. 19) as claimed in claim 1, wherein the number C of said series of signals to be transmitted is determined by the following equation $$C = (1 + \frac{n}{m})l = (m+n)K,$$
$$K = \frac{l}{m}$$

wherein *m* and *n* are positive integers corresponding to the time length of said signal and pause periods, respectively, *l* is the number of said plurality signals, and K is a positive integer.

8. A transmitter for transmitting in time division a plurality of signals through a transmission path having a plurality of channels provided alternately with signal and pause transmission periods at a predetermined time sequence, comprising gate means for dividing each series of signals among said plurality of signals into first signal parts the period of each of which is equal to said signal period and second signal parts the period of each of which is equal to said pause period, delay means for delaying either one of said first and second signal parts, signal combining means for forming a second signal series by combining sequentially only said second signal parts of said series of signals, and signal transmission means for transmitting a first signal series corresponding to said first signal parts and said second signal series obtained from said signal combining means by different channels.

9. A transmitter as claimed in claim 8, wherein said transmitter further comprises signal multiplexing means for multiplexing said plurality of signals so as to form a plurality of series of signals, the number of which series depends upon the ratio of time length between said signal and pause periods.

10. A transmitter as claimed in claim 8, wherein said transmitter comprises a first delay means for delaying the first signal part of the first series of signals among said plurality of signals by a delay time equal to said pause period, a second delay means for delaying the first signal part of the second series of signals among said plurality of signals by a delay time equal to twice said pause period, and so forth, an *n*th (*n* being a positive integer) delay means for delaying the first signal part of the *n*th series of signals among said plurality of signals by a delay time equal to *n* times said pause period, means for combining sequentially said second signal parts of said *n* series of signals so as to form said second signal series, and signal transmission means having a plurality of channels for separately transmitting *n* first signal series corresponding to said respective first signal parts with said second signal series obtained from said combining means through respective channels.

11. A transmitter as claimed in claim 8, wherein said transmitter comprises time-division multiplexing means for producing a plurality of time-division multiplex signals, the number of which depends upon the ratio of time length between said signal and pause periods, a first delay means for delaying the first signal part of the first time-division multiplex signal by a delay time equal to said pause period, a second delay means for delaying the first signal part of the second time-division multiplex signal by a delay time equal to twice said pause period, and so forth, an *n*th (*n* being a positive integer) delay means for delaying the first signal part of the *n*th time-division multiplex signal by a delay time equal to *n* times said pause period, means for combining sequentially said second signal parts of said *n* time division multiplex signals so as to form the second signal series, and signal transmission means having a plurality of channels for separately transmitting n first signal series corresponding to said respective first signal parts with said second signal series obtained from said combining means through respective channels.

12. A transmitter as claimed in claim 11, wherein said time-division multiplexing means multiplexes each of the signals to be transmitted by a plurality of channels in time-division so as to form binary PCM signals, each of which has many words composes of the even numbers of digits, and said transmitter further comprises means for combining the adjacent digits of odd and even numbers and for converting the combined signal into four-level PCM signals to be transmitted.

13. A transmitter as claimed in claim 11, wherein said time-division multiplexing means has means for arranging sampled signals of said multiplexing means in a manner that said first and second signal parts are adjacent to one another.

14. A transmitter as claimed in claim 11, wherein the number C of said series of signals to be transmitted is determined by the following equation $$C = \left(1 + \frac{n}{m}\right) l = (m+n)K,$$
$$K = \frac{l}{m}$$

wherein *m* and *n* are positive integers corresponding to the time length of said signal and pause periods respectively, *l* is the number of said plurality of signals, and K is a positive integer.

15. A receiver for receiving a plurality of signals transmitted through a transmission path having a plurality of channels provided alternately with signal and pause periods at a predetermined time sequence, the signals being transmitted including first and second parts, one of which parts has not been delayed, comprising signal reproducing means for reproducing the first and second signal parts selected from a received signal series, delay means for delaying either one of said first and second signal parts which has not been delayed at the transmitter, and signal combining means for combining sequentially the delayed signal parts obtained from said delay means with the other signal parts.

16. A receiver as claimed in claim 15 comprising a gate means for selecting a signal series received through a desired channel.

17. A receiver as claimed in claim 15 wherein said signal reproducing means reproduces n first signal parts and a signal series selected from the received signal series, and further said receiver comprises gate means for dividing said selected signal series into n second signal parts, a first delay means for delaying the second signal part of a first series of signals by a delay time equal to said pause period, a second delay means for delaying the second signal part of the second series of signals by a delay time equal to twice said pause period, and so forth, an *n*th delay means for delaying the second signal part of the *n*th series of signals by a delay time equal to *n* times said pause period, and signal combining means for combining sequentially the *n* delayed second signal parts from said delay means with the *n* first signal parts, respectively.

18. A receiver as claimed in claim 15 wherein said signal reproducing means reproduces *n* first signal parts of *n* time-division multiplex signals and a second signal series selected from the received signal series, and further said receiver comprises gate means for selecting a signal transmitted through a desired channel, delay means for delaying the second signal part within said selected signal by a delay time corresponding to the selected channel, and signal combining means for combining sequentially the first signal part within said selected signal with the delayed second signal part obtained from said delay means.

19. A receiver as claimed in claim 18, wherein said receiver comprises means for converting four-level PCM signals reproduced by said signal reproducing means into two-level binary PCM signals.

* * * * *